United States Patent
Xu et al.

(10) Patent No.: US 9,088,905 B2
(45) Date of Patent: Jul. 21, 2015

(54) METHOD AND APPARATUS FOR LOAD BALANCING ON A PRIORITY LEVEL BASIS OVER SHARED COMMUNICATIONS CHANNELS OF A COMMUNICATIONS SYSTEM

(75) Inventors: Jun Xu, Clarksburg, MD (US); John Border, Poolesville, MD (US); Robert Torres, New Market, MD (US); Yangang Li, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 13/453,692

(22) Filed: Apr. 23, 2012

(65) Prior Publication Data

US 2013/0279334 A1    Oct. 24, 2013

(51) Int. Cl.
*H04W 24/04* (2009.01)
*H04L 12/803* (2013.01)

(52) U.S. Cl.
CPC ............. *H04W 24/04* (2013.01); *H04L 47/125* (2013.01)

(58) Field of Classification Search
USPC .................... 370/229–240, 431, 118, 395.42, 370/395.41; 455/429, 13.3, 12.1, 427, 453, 455/11.1, 13.1, 13.4
See application file for complete search history.

(56) References Cited

U.S. PATENT DOCUMENTS

| | | | | |
|---|---|---|---|---|
| 7,729,244 | B2 * | 6/2010 | Sadr .............................. | 370/230 |
| 7,760,626 | B2 * | 7/2010 | Malpani et al. ............... | 370/230 |
| 2003/0072327 | A1 * | 4/2003 | Fodor et al. ................... | 370/468 |
| 2005/0030932 | A1 * | 2/2005 | Kelly et al. .................... | 370/345 |
| 2006/0072452 | A1 * | 4/2006 | Olariu et al. .................. | 370/229 |
| 2006/0215628 | A1 * | 9/2006 | Olariu et al. .................. | 370/348 |

\* cited by examiner

*Primary Examiner* — Benjamin H Elliott, IV
*Assistant Examiner* — Eric Nowlin
(74) *Attorney, Agent, or Firm* — Potomac Technology Law, LLC

(57) ABSTRACT

Methods and apparatus for performing dynamic load balancing across transmission channels in a communications system, for loads of multiple priorities for a plurality of terminals are provided. Priority levels for a plurality of traffic flows from the plurality of terminals are determined, and the traffic flows are assigned to a plurality of transmission channels to load balance the traffic flows based on the determined priority levels. The load balancing includes generating a load vector for each of the transmission channels, and determining a load balancing target for the load vectors. The load balancing further includes determining a centroid point for the generated load vectors, wherein the centroid point is the load balancing target, and iteratively converging to the centroid point as the load balancing target by determining cancellation pairs for the load vectors, to balance loads of multiple priorities.

8 Claims, 17 Drawing Sheets

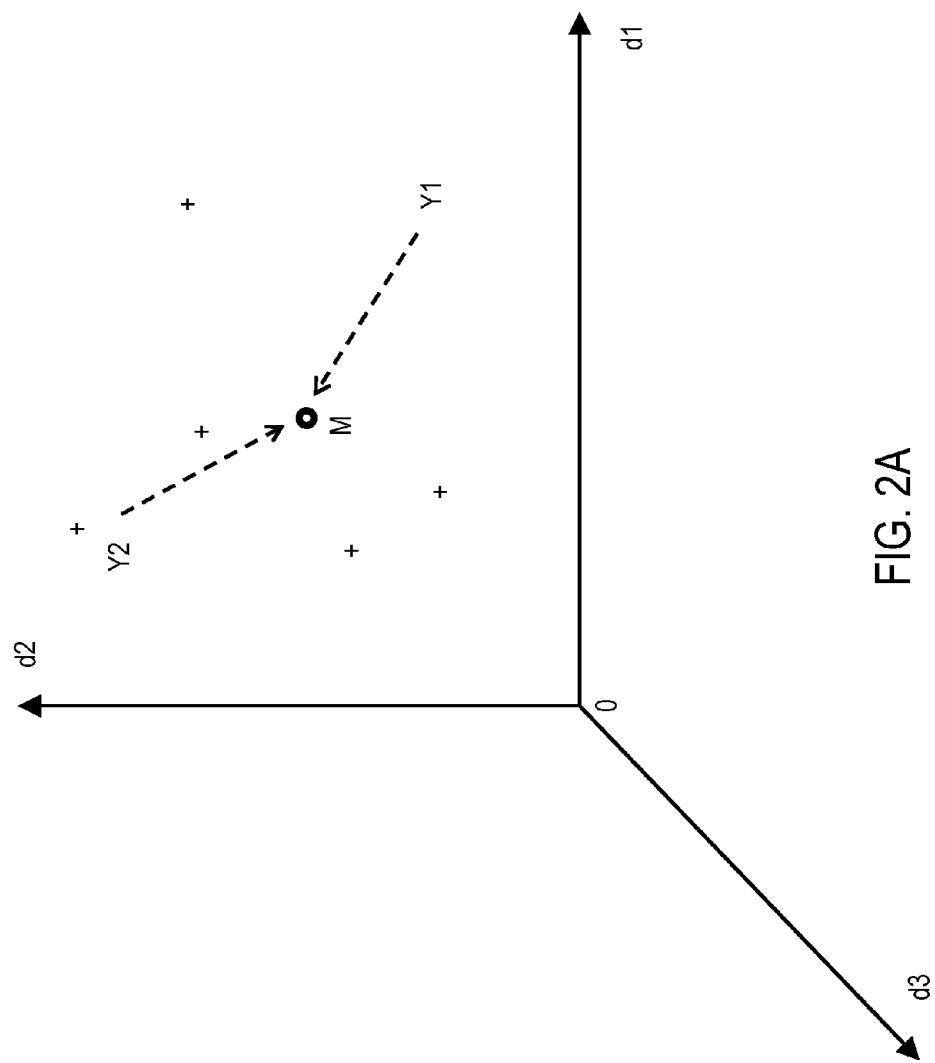

METHOD AND APPARATUS FOR LOAD BALANCING ON A PRIORITY LEVEL BASIS OVER SHARED COMMUNICATIONS CHANNELS OF A COMMUNICATIONS SYSTEM

FIELD OF THE INVENTION

The present invention relates to communications systems (such as in a satellite communications system), and, more particularly, to performing dynamic load balancing across transmission channels for loads of multiple priorities for a plurality of users or terminals in a communications system, and to determining load balancing for overall traffic load and at each priority level for multiple shared communications channels with a plurality of transmission terminals.

BACKGROUND

The overall capacities of broadband satellites and computer networks are increasing exponentially, and such capacity increases present unique challenges in the associated transmission systems and network designs. The goal of the system designers, system operators, and service providers is to support and provide efficient, robust, reliable and flexible services, in a shared bandwidth network environment, utilizing such high capacity satellite systems or computer networks. In current systems, for example, where multiple remote terminals or remote nodes are capable of accessing a public network (e.g., the Internet) or a remote network through one or more inroutes or aggregation nodes, assignment of remote nodes to a gateway or aggregation node create challenges and inefficiencies in network management, especially where system loads dynamically change, and the priorities of the loads for users or terminals change, over time. Accordingly, current systems fail to support efficient, robust, reliable and flexible broadband services, in such shared bandwidth network environments, utilizing such high capacity satellite systems and computer network systems.

Achieving efficient, robust, flexible and fast broadband services, in such high capacity, shared bandwidth, satellite system networks and computer network systems, however, poses unique challenges to system designers and operators. Further, design challenges exist in ensuring that remote terminals or remote nodes with traffic loads of multiple priorities are assigned for data transmission to available aggregation nodes or inroutes capable of providing the required transmission services, and ensuring that load balancing is dynamically employed across the inroutes or aggregation nodes to avoid overloading any one aggregation node or inroute. From a business standpoint, it is also desirable (yet challenging from a design standpoint) that available inroutes are selected for data transmission of multiple priority levels from a plurality of remote terminals, users or nodes to efficiently and effectively utilize network resources for load sharing in view of the priority level of the data being transmitted.

In network systems and computer systems, data traffic or tasks can arrive with different priorities. The mechanism to balance the traffic load or tasks such that each processing node or server could equally share a fair amount of load from different priorities is critical in providing satisfactory quality of service (QoS) and efficiently utilizing the network resource. A similar problem exists when balancing the load on channels in a satellite network. The use of queued data priorities as well as the data volume is used for fair allocation of resources.

A load balancing method has been proposed in the literature, but such load balancing method does not take into consideration the priority of the traffic loads, and only the total amount of load is considered for load balancing. However, such proposed load balancing method can have drawbacks as to efficient allocation of network resources. For example, although two processing nodes or terminals can have the same amount of traffic, if one has more traffic load of a highest, or a higher priority, and another has more traffic load of a lowest, or a lower, priority, then load balancing can become skewed from a priority perspective, which is not desirable or as efficient in terms of QoS provisioning of network resources for load transmission.

At the inroutes of satellite networks, there can be multiple inroutes, each with certain capacity supporting a number of terminals with multiple priority traffic classes. A simple legacy approach of balancing traffic loads over multiple inroutes balances loads such that each inroute can share similar amount of traffic load. As such balancing needs to exchange terminals across inroutes, the legacy approach proposed a way to make the number of changes reasonably minimum. The legacy approach focuses on the overall load. Nowadays, however, as more and more internet traffic crowds the network, data traffic turns to experience long latency during busy hours. As some traffic may be of a higher priority, and thus requires lower latency, such legacy approaches fail to address such higher priority traffic. Accordingly, the must not only balance the overall traffic loads over the multiple inroutes (transmission entities), but also must balance the traffic load on a priority-level basis, such that the high priority traffic will not be delayed in each inroute. To achieve the new target, the network still needs to exchange the number of terminals associated with each inroute dynamically at run time in a smarter and more comprehensive way, and also keep the number of exchanges reasonably minimal.

Thus, achieving efficient, robust, flexible and fast broadband services, in such a high capacity, shared bandwidth, satellite system network, however, poses unique challenges to system designers and operators to provide improved latency and throughput performance, as well as in high capacity computer networks, for load transmission. In this regard, design challenges exist in ensuring efficiently allocating traffic flows in real time over available transmission channels or inroutes capable of providing the required services for data transmission, and ensuring that load balancing, taking into consideration load priority, is dynamically employed across one or more transmission channels for a plurality of remote terminals or nodes.

What is needed is a system design and method that employs a dynamic and flexible architecture for load balancing of traffic loads of remote terminals or remote nodes to inroutes or aggregation nodes, which would meet various requirements and desires associated with efficient, robust, reliable and flexible broadband services in a high capacity, shared bandwidth, satellite networks or computer systems, and that would be relatively efficient and automated from a network management standpoint. Further, in communications networks, for multiple traffic classes with different priorities, what is further needed and desirable, is to not only balance the total traffic amount among the processing nodes, inroutes or transmission channels, but also to achieve a status that traffic for each priority class is balanced over those inroutes, nodes or transmission channels.

Some Exemplary Embodiments

The present invention advantageously addresses the needs above, as well as other needs, by providing dynamic and flexible architecture, apparatus and methods for dynamic load balancing across transmission channels for loads of multiple priorities for a plurality of users or terminals in a communications system, and to determining load balancing for overall traffic load and at each priority level for multiple shared communications channels with a plurality of transmission terminals. Such aspects of the invention promote and satisfy various requirements and desires associated with efficient, robust, reliable and flexible broadband services in a high capacity, shared bandwidth network, such as a satellite or computer network, and that is relatively efficient and automated from a network management and load balancing standpoint.

According to an exemplary embodiment, a method comprises determining priority levels for a plurality of traffic flows from a plurality of terminals, and assigning the traffic flows to a plurality of transmission channels using a load balancing scheme to load balance the traffic flows based on the determined priority levels, wherein the load balancing scheme comprises, generating a load vector for each of the transmission channels, and determining a centroid point for the load vectors, wherein the centroid point is an example of a load balancing target, according to aspects of the invention.

According to a further exemplary embodiment of the method, the load balancing scheme further comprises iteratively converging to the centroid point by determining cancellation pairs for the load vectors.

According to a further exemplary embodiment, the communications system comprises one or more of a satellite network or a computer network, and the plurality of transmission channels comprises one or more of a satellite communications system or a computer network.

According to another exemplary embodiment, the method comprises determining priority levels for a plurality of traffic flows from a plurality of terminals in the communications system and assigning the traffic flows to a plurality of transmission channels using a load balancing scheme to load balance the traffic flows based on the determined priority levels, wherein the load balancing scheme comprises generating a load vector for each of the transmission channels, and determining a load balancing target for the load vectors based on the generated load vectors. In such exemplary method, as previously described, one example of a load balancing target can be a centroid point for the generated load vectors, although other load balancing targets can be utilized in load balancing, according to aspects of the invention, such as depending on the process and application in which load balancing is applied.

According to another exemplary embodiment, the method comprises determining available inroutes as transmission channels for load transmission in the communications system, determining terminals having traffic loads for transmission on the available transmission channels, determining priority levels of the traffic loads for a plurality of traffic flows from terminals on the available transmission channels, determining the traffic loads for each of the determined priority levels for the traffic flows from the terminals for transmission on an available transmission channel, generating a plurality of load vectors for the available transmission channels, each generated load vector representative of the traffic loads for each of the determined priority levels of the terminals having traffic flows for transmission on an available transmission channel, and determining a load balancing target from the generated plurality of load vectors for the available transmission channels to load balance the plurality of traffic flows on the available transmission channels based on the determined priority levels of the traffic loads.

According to another exemplary embodiment, the method further comprises assigning the plurality of traffic flows to the available transmission channels using a load balancing scheme to load balance the traffic flows based on the determined priority levels and the load balancing target.

According to another exemplary embodiment, the method further comprises iteratively converging to the centroid point for generated load vectors by determining cancellation pairs of load vectors for terminals in relation to the centroid point, comprising determining for the inroute transmission channel load vectors a difference between the inroute load vector for a transmission channel and the centroid point, as an example of a load balancing target, as a difference vector, and determining a cancellation pair for the inroute load vectors by comparing the determined difference vectors in relation to the centroid point whereby the determined difference vectors converge on the centroid point at a distance within a predetermined range for a cancellation pair of inroute load vectors.

According to another exemplary embodiment, the method further comprises determining a best matching point for load balancing in each of a pair of available transmission channels for assigning traffic flows from terminals, which comprises generating a target adjustment vector for a pair of available transmission channels, and determining a terminal load vector for transmission in either of the pair of transmission channels where a distance between the target adjustment vector and a terminal load vector is within a minimum distance range; and also comprises assigning the traffic flow for the terminal load vector to the transmission channel based upon the determined best matching point.

According to another exemplary embodiment, the method further comprises iteratively converging to the centroid point of the generated load vectors, as an example of a load balancing target, by determining a parallel convergence of the inroute transmission channel vectors in relation to the centroid point, where the parallel convergence comprises determining for each of the inroute transmission channel load vectors a difference between the inroute load vector for a transmission channel and the centroid point as a target vector, and determining as a best matching point for a terminal load vector for transmission in an inroute transmission channel where a distance between the target vector for the inroute transmission channel and the terminal load vector is within a minimum distance tolerance range. Also, such exemplary method comprises assigning the traffic flow for the terminal load vector to the transmission channel based upon the determined best matching point.

According to another exemplary embodiment, the method also comprises generating an inroute transmission channel load vector set, the load vector set comprising the load vectors for the plurality of available transmission channels, generating a difference vector set, the difference vector set comprising a plurality of difference vectors representing a difference between each of the vectors in the load vector set and the centroid point, determining match pairs of the difference vectors in the generated difference vector set by iteratively comparing one and another of the difference vectors in relation to the centroid point, wherein each match pair of the difference vectors is determined by a pair of difference vectors that converges on the centroid point at a distance within a predetermined range so as to cancel their difference to the centroid point, and generating a match pair set comprising each determined match pair of difference vectors. Also, the method comprises assigning the traffic flows from the terminals in the transmission channels corresponding to each determined match pair of difference vectors by load balancing terminal load vectors for the terminals between the transmission channels corresponding to a determined match pair.

According to another exemplary embodiment, the method also comprises performing iteratively a terminal vector swap of the terminal load vectors in the inroute transmission channels that correspond to a determined match pair of difference vectors to load balance the terminal load vectors for the terminals between transmission channels corresponding to the determined match pair. The terminal vector swap comprises generating a target adjustment vector for the pair of transmission channels corresponding to a determined match pair of difference vectors, determining a load vector adjustment distance for a terminal load vector in the pair of transmission channels corresponding to the determined matched pair; and determining the terminal load vector for transmission in a transmission channel of the pair of transmission channels corresponding to the determined match pair based upon the determined load vector adjustment distance in relation to a target adjustment vector distance for the target adjustment vector.

Also, in exemplary embodiments, iteratively performing the terminal vector swap in the load balancing comprises performing iteratively, for the determined match pairs of difference vectors in the match pair set, the terminal vector swap for the terminal load vectors in the inroute transmission channels that correspond to a determined match pair of difference vectors, and assigning the traffic flows from the terminals in the transmission channels corresponding to the determined match pairs of difference vectors based upon the performed terminal vector swaps.

According to another exemplary embodiment, an apparatus for load balancing in a communications system comprises a controller for controlling traffic load in the communications system, the controller comprising a processor for performing operations and processing information for traffic load control in the communications system, a memory for storing information and instructions for execution by the processor, and a communications interface for communications of data or information to or from the controller, wherein the controller determines priority levels for a plurality of traffic flows from a plurality of terminals in the communications system, and assigns the traffic flows to a plurality of transmission channels using a load balancing scheme to load balance the traffic flows based on the determined priority levels, wherein the controller in assigning the traffic flows generates a load vector for each of the transmission channels, and determines a load balancing target for the load vectors based on the generated load vectors.

According to another exemplary embodiment, in an apparatus for load balancing in a communications system comprising a controller having the above described aspects, the controller in execution of the load balancing scheme further determines a centroid point for the generated load vectors, wherein the centroid point comprises the load balancing target, and executes operations on the generated load vectors to iteratively converge to the centroid point as the load balancing target, by determining cancellation pairs for the load vectors.

In accordance with exemplary embodiments, the communications system for load balancing comprises a satellite communications system and the controller comprises at least one inroute group manager of one or more gateways in the satellite communications system. Also, the communications system for load balancing can comprise a computer network system, and the controller can comprise one or more processors in the computer system. Also, in exemplary embodiments, such as in a satellite communications system, the plurality of transmission channels for load balancing can comprise channels that operate according to an Aloha protocol or a diversity Aloha protocol.

According to further exemplary embodiments, an apparatus for load balancing in a communications system comprises a controller for controlling traffic load in the communications system, the controller comprising a processor for performing operations and processing information for traffic load control in the communications system, a memory for storing information and instructions for execution by the processor, and a communications interface for communications of data or information to or from the controller, wherein the controller determines available inroutes as transmission channels for load transmission in the communications system, determines terminals having traffic loads for transmission on the available transmission channels, determines priority levels of the traffic loads for a plurality of traffic flows from terminals on the available transmission channels; determines the traffic loads for each of the determined priority levels for the traffic flows from the terminals for transmission on an available transmission channel, generates a plurality of load vectors for the available transmission channels, each generated load vector representative of the traffic loads for each of the determined priority levels of the terminals having traffic flows for transmission on an available transmission channel, and determines a load balancing target from the generated plurality of load vectors for the available transmission channels to load balance the plurality of traffic flows on the available transmission channels based on the determined priority levels of the traffic loads.

According to further exemplary embodiments, the controller in execution of the load balancing scheme further assigns the plurality of traffic flows to the available transmission channels using a load balancing scheme to load balance the traffic flows based on the determined priority levels and the load balancing target. Also, for example, in exemplary embodiments, the controller in execution of the load balancing scheme further determines a centroid point for the generated load vectors, wherein the centroid point is the load balancing target.

According to further exemplary embodiments, the controller, in execution of the load balancing scheme, further generates an inroute transmission channel load vector set, the load vector set comprising the load vectors for the plurality of available transmission channels, generates a difference vector set, the difference vector set comprising a plurality of difference vectors representing a difference between each of the vectors in the load vector set and the centroid point, determines match pairs of the difference vectors in the generated difference vector set by iteratively comparing one and another of the difference vectors in relation to the centroid point, wherein each match pair of the difference vectors is determined by a pair of difference vectors that converges on the centroid point at a distance within a predetermined range so as to cancel their difference to the centroid point; and generates a match pair set comprising each determined match pair of difference vectors. Also, in exemplary embodiments, the controller, in execution of the load balancing scheme, further assigns the traffic flows from the terminals in the transmission channels corresponding to each determined match pair of difference vectors by load balancing terminal load vectors for the terminals between the transmission channels corresponding to a determined match pair.

Additionally, according to further exemplary embodiments, the controller, in execution of the load balancing scheme, further performs iteratively a terminal vector swap of the terminal load vectors in the inroute transmission channels that correspond to a determined match pair of difference vectors to load balance the terminal load vectors for the terminals between transmission channels corresponding to the determined match pair, wherein the controller in performing the terminal vector swap generates a target adjustment vector for the pair of transmission channels corresponding to a determined match pair of difference vectors, determines a load vector adjustment distance for a terminal load vector in the pair of transmission channels corresponding to the determined match pair, and determines the terminal load vector for transmission in a transmission channel of the pair of transmission channels corresponding to the determined match pair based upon the determined load vector adjustment distance in relation to a target adjustment vector distance for the target adjustment vector.

Further, in exemplary embodiments, the controller, in execution of the load balancing scheme, performs iteratively, for the determined match pairs of difference vectors in the match pair set, the terminal vector swap for the terminal load vectors in the inroute transmission channels that correspond to a determined match pair of difference vectors, and assigns the traffic flows from the terminals in the transmission channels corresponding to the determined match pairs of difference vectors based upon the performed terminal vector swaps.

Additionally, in exemplary embodiments, the controller in execution of the load balancing scheme further iteratively converges the generated load vectors to the centroid point by determining cancellation pairs of load vectors for terminals in relation to the centroid point. In exemplary embodiments, the controller in iteratively converging by cancellation pairs the generated load vectors in execution of the load balancing scheme determines for the inroute transmission channel load vectors a difference between the inroute load vector for a transmission channel and the centroid point as a difference vector, and determines a cancellation pair for the inroute load vectors by comparing the determined difference vectors in relation to the centroid point, whereby the determined difference vectors converge on the centroid point at a distance within a predetermined range for a cancellation pair of inroute load vectors.

According to further exemplary embodiments, the controller in execution of the load balancing scheme further determines a best matching point for load balancing in each of a pair of available transmission channels for assigning traffic flows from terminal, wherein the controller in determining the best matching point generates a target adjustment vector for a pair of available transmission channels, and determines a terminal load vector for transmission in either of the pair of transmission channels where a distance between the target adjustment vector and a terminal load vector is within a minimum distance range, and assigns the traffic flow for the terminal load vector to the transmission channel based upon the determined best matching point.

Additionally, according to further exemplary embodiments, the controller in execution of the load balancing scheme further iteratively converges the generated load vectors to a centroid point by determining a parallel convergence of the inroute transmission channel vectors in relation to the centroid point. Also, in exemplary embodiments, where the controller, in iteratively converging by parallel convergence the generated load vectors in execution of the load balancing scheme, further determines for each of the inroute transmission channel load vectors a difference between the inroute load vector for a transmission channel and the centroid point as a target vector, and determines as a best matching point for a terminal load vector for transmission in an inroute transmission channel where a distance between the target vector for the inroute transmission channel and the terminal load vector is within a minimum distance tolerance range. Further, in exemplary embodiments, the controller, in execution of the load balancing scheme, further assigns the traffic flow for the terminal load vector to the transmission channel based upon the determined best matching point.

According to further exemplary embodiments, determining load balancing for overall traffic load and at each priority level for multiple shared communication channels with a plurality of transmission terminals.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A depicts an inroute load vector model in a multidimensional space, illustrating inroute traffic loads in relation to a centroid point as a load balancing target, in accordance with exemplary embodiments;

DETAILED DESCRIPTION

Figure 1A:
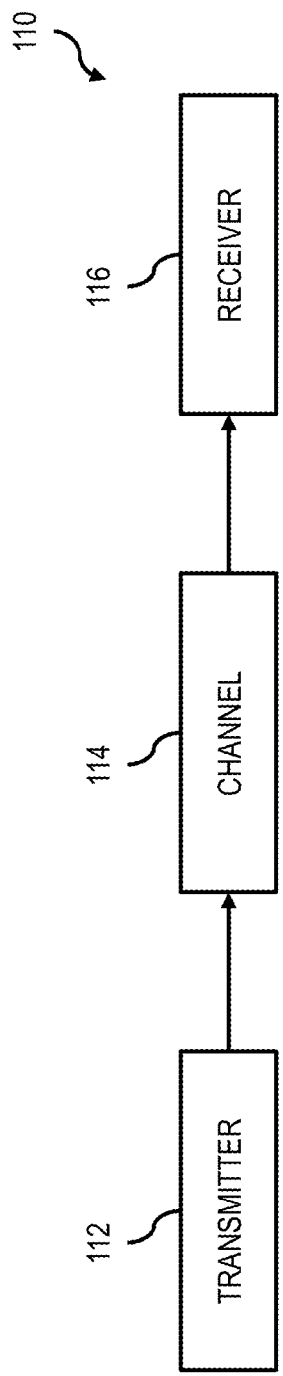
FIGS. 1A, 1B and 1C illustrate communications systems capable of employing a dynamic and flexible architecture, apparatus and methods for priority load balancing of traffic loads transmitted from remote terminals or remote nodes, in accordance with various exemplary embodiments.

In accordance with an aspect of the present invention, dynamic and flexible architectures, apparatus and methods are provided for dynamic load balancing for overall traffic load, and per each priority level, for multiple shared communication channels of a plurality of transmission terminals in a communications system. Such architectures, apparatus and methods achieve various requirements and desires associated with efficient, robust, reliable and flexible broadband services in a high capacity, shared bandwidth, communications network, such as a satellite communications network or a computer network, and that is relatively efficient and automated from a network management and load balancing standpoint.

In such a shared bandwidth network, for example, where multiple remote nodes or remote terminals access broadband services through one or more aggregation nodes (e.g., gateways), according to various exemplary embodiments, the present architecture, apparatus and method for load balancing by association of remote nodes with respective aggregation nodes for data transmission based on balancing of traffic loads of traffic flows from a plurality of terminals based on determined priority levels of the traffic flows from the plurality of terminals in a communications system, satisfies various requirements and desires related to the provision of efficient, robust, reliable and flexible broadband services. For example, in accordance with an exemplary embodiment, based on the services for which a remote node (e.g., a user terminal or node) is configured (e.g., the services to which a user of the terminal has subscribed), the terminal utilizes one or more quantitative service criteria for selecting a pool of aggregation nodes that meet such service criteria. In other words, a terminal selects an aggregation node from an eligible pool of aggregation nodes or gateways that support service configurations and subscriptions that satisfy the service requirements of the terminal, such as for data transmission of traffic load. A terminal associates with an aggregation node by selecting a particular node (from a pool of suitable aggregation nodes available to the terminal) for provision of the required services to the terminal. Once the terminal completes an association process according to exemplary protocols of embodiments of the invention, and the aggregation node accepts the association, the terminal becomes associated with the selected aggregation node. Aspects of load balancing of the invention, according to the priority of the traffic loads of the terminals associated with a selected aggregation node, such as a gateway or controller that controls access to a plurality of transmission channels, can apply to the transmission of traffic loads from the associated terminals over the plurality of available transmission channels.

Further, the exemplary methods and apparatus for aspects of the invention are applicable to pooled redundancy and dynamic load balancing. For example, terminals can overcome aggregation node failures and utilize other aggregation nodes, or gateways for transmission of their traffic loads. And load balancing, according to aspects of the invention, can be implemented by load balancing according to the priority of the traffic loads of the terminals associated with a redundant node or other aggregation node, such as a gateway or controller that controls access to a plurality of transmission channels, that can apply load balancing to the transmission of traffic loads from the associated terminals over the plurality of available transmission channels, such as for one-to-one hot redundancy for recovering from hardware failures, Terminals can also dynamically transition to a diverse gateway, for example, when a gateway or communications link failure requires a transition to a secondary gateway (which, for example, can be a redundant gateway or an operational gateway at a diverse site). And load balancing, according to aspects of the invention, can be implemented by load balancing according to the priority levels of the traffic loads of the terminals associated with a redundant node or other aggregation node of such diverse gateway.

In accordance with an exemplary embodiment, in which aspects of load balancing according to the invention can be implemented, can include a shared bandwidth network for data transmission that comprises a broadband satellite communications system, where multiple remote nodes (e.g., satellite terminals (STs)) access broadband services through one or more aggregation nodes (e.g., gateways (GWs) or IP gateways (IPGWs). Another example is a computer network for data transmission over communications channels from remote terminals that communicate data over such communications channels.

Figure 1B:
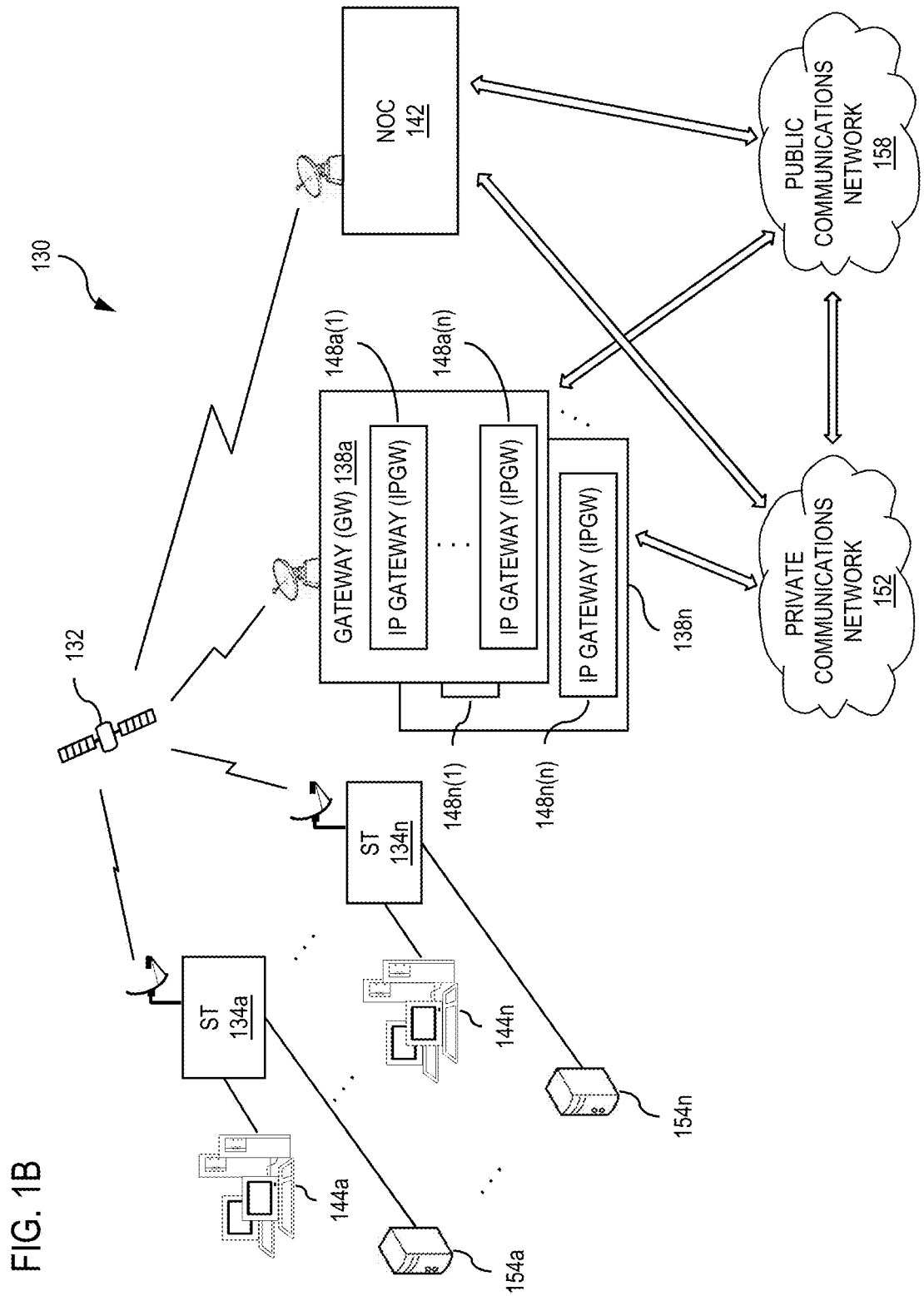
Figure 1C:
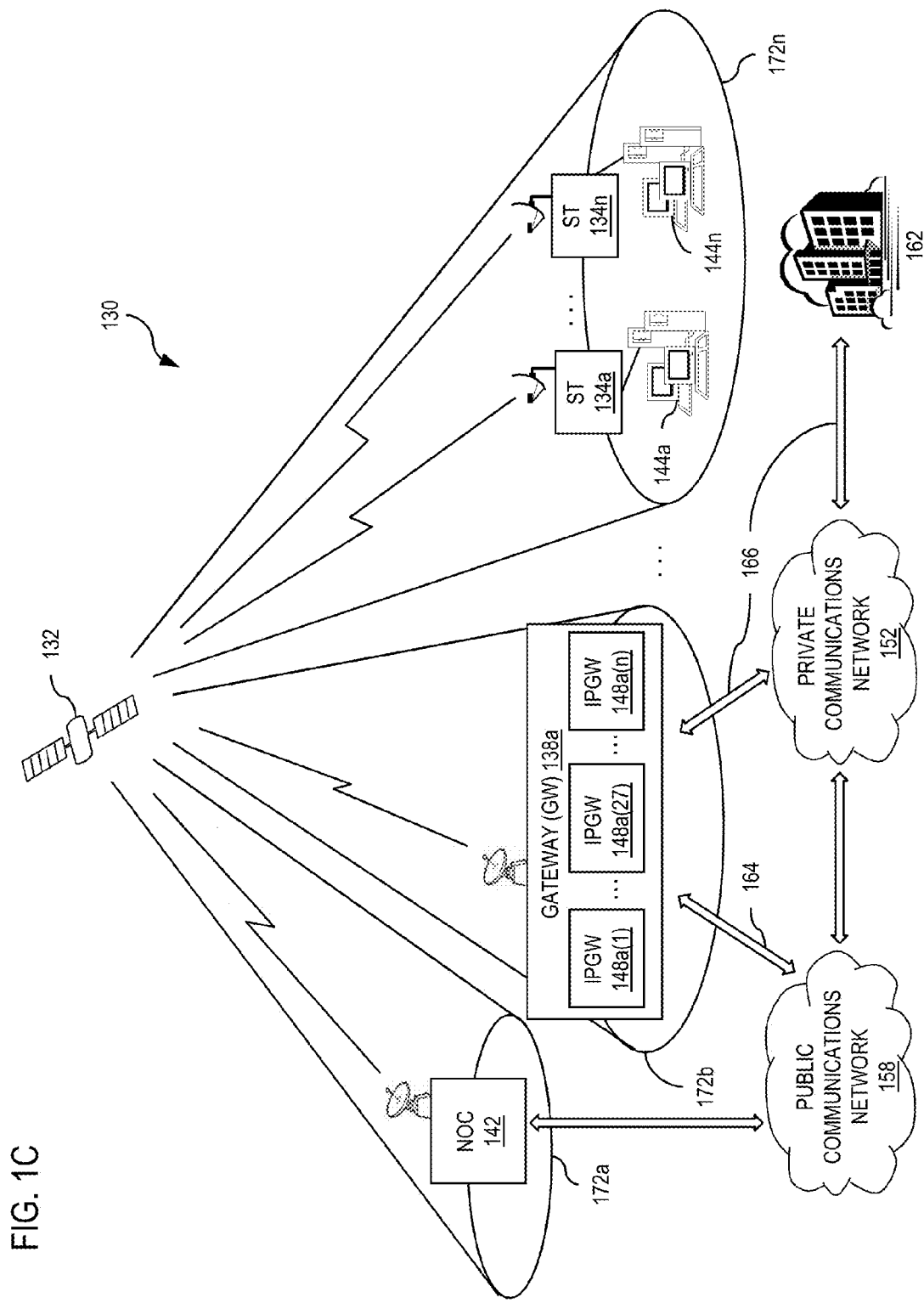

FIGS. 1A-1C illustrate exemplary communications systems capable of employing a dynamic and flexible architecture, apparatus and methods for dynamic load balancing according to the priority levels of the traffic loads of the terminals associated with a communications system, according to aspects of the invention. With reference to FIG. 1A, a digital communications system 110, such as a satellite or computer network communications system, includes one or more transmitters 112 (of which one is shown) that generate signal waveforms across a communications channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. To combat noise and other issues associated with the channel 114, coding can be utilized. For example, forward error correction (FEC) codes can be employed.

FIG. 1B illustrates an exemplary satellite communications system 130, as an example of a communications system, capable of supporting communications among terminals with varied capabilities, that support and implement aspects of the invention, according to exemplary embodiments for dynamic load balancing according to the priority levels of the traffic loads of the terminals associated with a communications system. Satellite communications system 130 includes a satellite 132 that supports communications among multiple satellite terminals (STs) 134a-134n, a number of gateways (GWs) 138a-138n, and a network operations center (NOC) 142. The NOC 142 performs the management plane functions of the system 130, while the GWs 138a-138n perform the data plane functions of the system 130. For example, the NOC 142 can perform such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 can communicate with each GW via the satellite 132, or via a secure private communications network 152 (e.g., an IPsec tunnel over a dedicated link or a virtual private network (VPN) or IPsec tunnel through a public network, such as the Internet). Additionally, each GW and the NOC can have connectivity to one or more public communications networks 158, such as the Internet or a PSTN.

According to a further exemplary embodiment, each of the GWs 138a-138n, can include one or more controllers, such an one or more inroute group managers (IGM), for performing operations and processing information for traffic load control in the communications system, and can include one or more gateways (IPGWs)—whereby the data plane functions are divided between a GW and its respective IPGWs. For example, GW 138a can include IPGWs 148a(1)-148a(n) and GW 138n can include IP GWs 148n(1)-148n(n). A GW can perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW can perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW can be collocated with the NOC 142. The STs 134a-134n can provide connectivity to one or more hosts 144a-144n and/or routers 154a-154n, respectively. The satellite communications system 130 can operate as a bent-pipe system, where the satellite essentially operates as a repeater or bent pipe. Alternatively, the system 130 can employ a switching or processing satellite supporting mesh communications (point-to-point communications directly between, for example, the two STs 134a and 134n).

In a communications system 130 that employs a processing satellite (e.g., including a packet switch operating, for example, at a data link layer), the system can support direct unicast (point-to-point) communications and multicast communications among the STs 134a-134n and GWs 138a-138n. In the case of a processing satellite, the satellite 132 decodes the received signal and determines the destination ST or STs and/or GWs. The satellite 132 then addresses the data accordingly, encodes and modulates it, and transmits the modulated signal to the destination ST or STs (e.g., ST 134n) and/or GWs (and their respective IPGWs). According to exemplary embodiments, the system 130 thereby provides a fully meshed architecture, whereby the STs 134a-134n can directly communicate, via a single hop, over the satellite 132.

In a bent-pipe system of an exemplary embodiment, the satellite 132 operates as a repeater or bent pipe, and communications to and from the STs 134a-134n are transmitted over the satellite 132 to and from respective IPGWs associated with particular STs. Further, in a spot beam system, any one spot beam (e.g., FIG. 1C, beams 172a-172n) operates as a bent-pipe to a geographic region covered by the beam. For example, each spot beam operates as a bent pipe communications channel to and from the STs and/or IPGW(s) within the geographic region covered by the beam. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW can serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), or locations of available terrestrial data centers (e.g., terrestrial data trunks for access to public and private dedicated networks).

More specifically, with reference to FIG. 1C, for example, for a data communications from ST 134a to a public communications network 158 (e.g., the Internet), the ST 134a can be associated with an IPGW (e.g., IPGW 148a(1)—selected from a pool of IPGWs available to the ST 134a, such as IPGWs 148a(1)-148a(27)—where the pool of IPGWs is a suitable subset of the IPGWs 148a(1)-148a(n) located at the GW 138a). The data is first transmitted, via the satellite 132, from the ST 134a to associated IPGW 148a(1). The data transmission can be based, at least in part, for example, on dynamic load balancing to load balance the traffic flows based on the determined priority levels of the traffic loads, transmitted from a GW, such as from a GW Inroute Group Manager (IGM), such as for an IPGW, according to aspects of the invention, to promote optimization of load balancing of traffic loads based upon the priorities of the loads in the communications channels serviced by the GWs. The IPGW 148a(1) determines the destination as being the Internet 158. The IPGW then repackages the data (e.g., as a TCP/IP communications), and routes the data communications, via the terrestrial link 164, to the Internet 158. Further, in a corporate network, for example, a corporation can deploy various remote STs at remote offices. More specifically, ST 134n, located at a remote corporate location, can desire to securely communicate with the corporate headquarters 162. Accordingly, for a data communications from ST 134n to the corporate headquarters 162, the data is first transmitted, via the satellite 132, from the ST 134n to an IPGW associated with the ST 134n (e.g., IPGW 148a(27)). The IPGW 148a(27) determines the destination as being the corporate headquarters 162. The IPGW then repackages the data (e.g., as an IPsec communications), and routes the IPsec data communications, via the secure terrestrial links 166 (over the private network 152), to the corporate headquarters 162. In the corporate network scenario, a further example can involve a corporate communications from the corporate headquarters to a number of remote sites (e.g., a multicast communications to STs 134a-134n)—where STs 134a-134n are correspondingly associated with the two IPGWs 148a(1) and 148a(27) (e.g., grouped between the two IPGWs based on load balancing and IPGW capabilities). In this scenario, a gateway or router, within the local network of corporate headquarters 162, transmits the data communications, via the secure terrestrial links 166 (over the private network 152), to the IPGWs 148a(1) and 148a(27). The IPGWs determine that the communications is destined for the remote STs 134a-134n, and package the data as a multicast communications addressed to the community of STs 134a-134n. The IPGWs then transmit the data communications, via the satellite 132, for decoding by the community of STs 134a-134n. Accordingly, the satellite 132 of such a system acts as a bent pipe or repeater, transmitting communications between the STs 134a-134n and their respective associated IPGWs 148a-148n.

Moreover, according to various exemplary embodiments and aspects of the invention, controllers in the communications system can be capable of performing dynamic load balancing to load balance the traffic flows based on the priority levels of the traffic loads, at various different levels of the communications system, such as by controllers associated with the respective GWs, such as in a satellite network, or by controllers in computer networks, for example. Further, for example, load balancing according to aspects of the invention, can be performed across multiple outroutes of multiple IPGWs in transmitting the traffic flows from a plurality of terminals (either within a single satellite beam or across geographically diverse IPGWs), where the messaging to and from the various IPGWs is directed by the satellite to the beam(s) within which the STs are located, and on channels that the STs are capable of accessing.

Also, to promote and implement transmission of data of various traffic loads over communications channels, metrics are sent to the terminal that allows the terminal to employ a traffic control policy to govern the traffic using communications channels, such as random access channels, i.e., Aloha channels. Such traffic control policy can relate load balancing to load balance the traffic flows based on the determined priority levels, according to aspects of the invention For the purpose of convenience, random access channel and Aloha channel are exchangeably used in the context, and should not be construed in a limiting sense. Also, the traffic control policy can vary as follows as a function of the metrics and its configuration.

Therefore, the IPGW, of a GW, for example, periodically transmits its capabilities multicast message (CMM), such message can include information as to assignment of traffic flows to load balance the traffic flows based on the determined priority levels of traffic loads, according to aspects of the invention. The CMM indicates the loading, service capabilities, and current state of the IPGW. The CMM is multicast from each IPGW to every terminal in the outroute stream on which the IPGWs traffic is transmitted. Each IPGW periodically multicasts the CMM, provided that the IPGW has a service signature key, is in a service state (e.g., not in a maintenance state), and has a configuration related to capabilities. While each IPGW sends the CMM out at a similar periodicity, the periodicity is configurable, and synchronization is not required across IPGWs as to when they actually send the CMM. Under certain conditions, an IPGW can send the CMM, containing assignment of traffic flows to load balance the traffic flows based on the determined priority levels of traffic loads, more frequently than the standard periodicity.

In accordance with a further aspect of the invention, the CMM can include information reflecting the web acceleration servers (e.g., PEP backbone servers) available through the respective IPGW, along with assignment of traffic flows to load balance the traffic flows based on the determined priority levels of traffic loads for each of the servers of the communications channels serviced by the servers. In such a case, the traffic loads of STs can also be load balanced across the web acceleration servers by associating with an IPGW that would provide access to a suitable web acceleration server that is not overloaded, based upon assignment of traffic flows to load balance the traffic flows based on the determined priority levels of traffic loads, according to aspects of the invention. The CMM can further contain an indication of supported web acceleration servers and loading, such as including information based on traffic flows for load balancing the traffic flows based on the determined priority levels of traffic loads, and can provide a list of web acceleration servers supported by the IPGW, along with a loading metric for each server that is used when selecting a web acceleration server, such as in a satellite or computer network, according to aspects of the invention.

Figure 10:
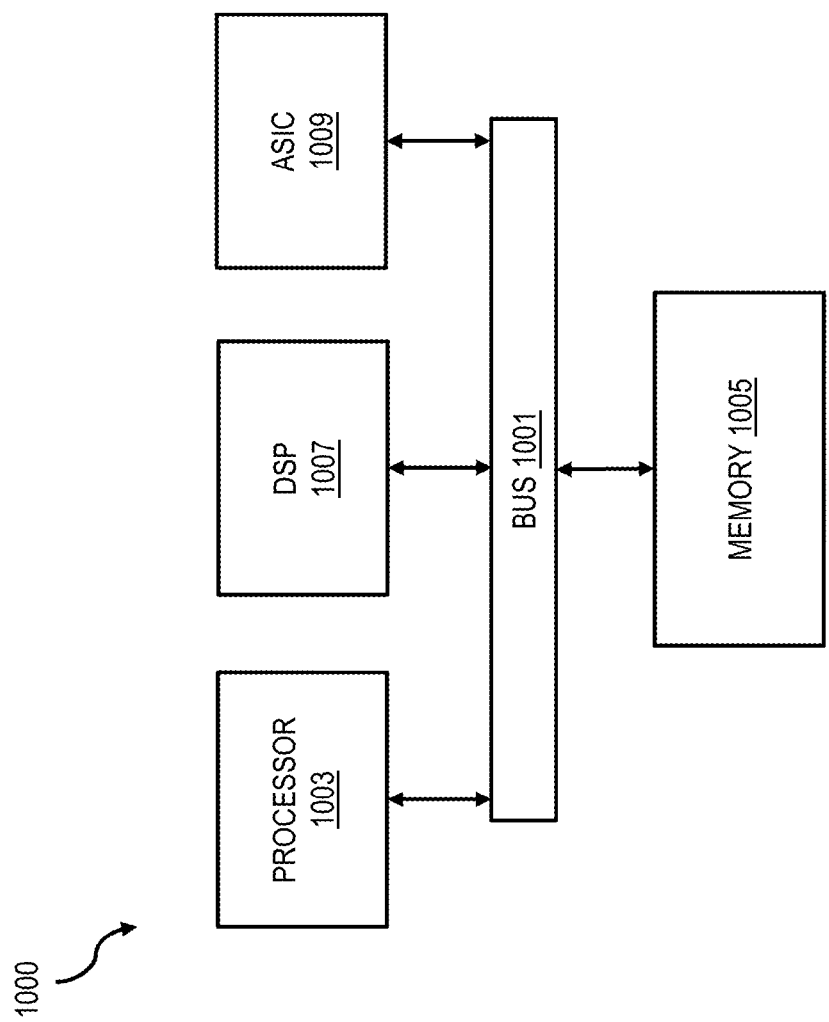
FIG. 10 is a diagram of a chip set that can be utilized in implementing architectures, apparatus and methods for dynamic load balancing of traffic loads of traffic flows from a plurality of terminals based on determined priority levels of the traffic flows from the plurality of terminals in a communications system, according to exemplary embodiments.

The architectures, apparatus and methods for dynamic load balancing according to aspects of the invention, based upon determined priority levels for a plurality of traffic flows from a plurality of terminals, and assigning the traffic flows to a plurality of transmission channels using a load balancing scheme to load balance the traffic flows based on the determined priority levels, such as to a random access channel or Aloha channel, such as in a satellite network or computer network communications system, according to exemplary embodiments of the present invention, can be implemented, at least in part, by one or more chip sets, including one or more controllers with processors and memory, as illustrated in FIG. 10 (showing one such controller processor). The chip set 1000 can be incorporated into the remote terminals, such as STs, and/or in GWs/IPGWs, or in remote terminals and/or controllers/servers of computer networks and systems according to aspects of the invention. As such, the chip set 1000 provides a means for accomplishing various parts of the algorithms and protocols herein described and illustrated. Further, different aspects of such algorithms and protocols can be allocated to the components of the chip set, as would be prudent based on design choices that would be apparent to one of skill in the art.

As illustrated by the exemplary embodiments, innovative methods and apparatus to control the traffic volume of traffic loads of different priority levels, such as that accesses the Aloha channels, such as in a satellite network communications system, is presented by way of example. However, the apparatus and methods illustrating innovative aspects of the exemplary embodiments have a broader applicability to other types of communications channels and communications systems, such as in other satellite network and computer network communications systems; and, therefore, applicability of such methods and apparatus should not be construed in a limiting sense.

An advantageous aspect of the invention, as demonstrated by the exemplary embodiments, is that a load balancing of traffic loads is achieved that not only balances the over traffic on transmission or communications channels, but also load balances traffic loads based on the different priority levels of the traffic loads, which promotes a significant improvement in the latency performance for Aloha traffic, or for traffic on communications channels, in general. Also, a further advantageous aspect of the invention is that a load balancing of traffic loads is achieved by determining load balancing for overall traffic load and at each priority level for multiple shared communication channels with a plurality of transmission terminals. Further advantageous and innovative aspects, include, for example, apparatus that includes a controller in a communications system, such as in a satellite gateway or in a computer network, that determines priority levels for a plurality of traffic flows from a plurality of terminals in the communications system, and assigns the traffic flows to a plurality of transmission channels using a load balancing scheme to load balance the traffic flows based on the determined priority levels. The controller in assigning the traffic flows generates a load vector for each of the transmission channels, and determines a load balancing target for the load vectors based on the generated load vectors, And, as a result of such dynamic load balancing, multiple innovative methods and apparatus are likewise provided to advantageously react to the changing loading metrics by the communications network.

In describing aspects of the invention, considering the similarity in applicability to load balancing for various types of communications systems, various terms can be considered interchangeably, as for example, source-processing node, client-server, mobile user-base station, remote terminal-satellite gateway, among others, but should not be construed in a limiting sense. Also, in the following discussion, describing the exemplary embodiments, in terms of a satellite communications network and the inroute direction (such as the direction from a remote terminal to the satellite gateway station) of a satellite network are by way of example only, and, likewise, should not to be construed in a limited sense.

Methods and apparatus of the invention by reference to the exemplary embodiments are described with reference to FIGS. 2A-4D, in relation to load balancing traffic load for a plurality of terminals, or users, to a plurality of transmission channels, or inroutes, by assigning, or allocating, the traffic flows to a plurality of transmission channels using a load balancing scheme to load balance the traffic flows based on the determined priority levels of the traffic loads for the terminals. The exemplary embodiments are, by way of example, applied in reference to satellite communications networks that utilize, for example, Aloha or random access channels, although the aspects of the invention are not limited in this regard, but can apply broadly to communications channels in other communications networks, such as various satellite networks and computer networks, or combinations thereof. Thus, the exemplary embodiments and aspects of the invention should not be construed in a limiting sense.

Figure 2B:
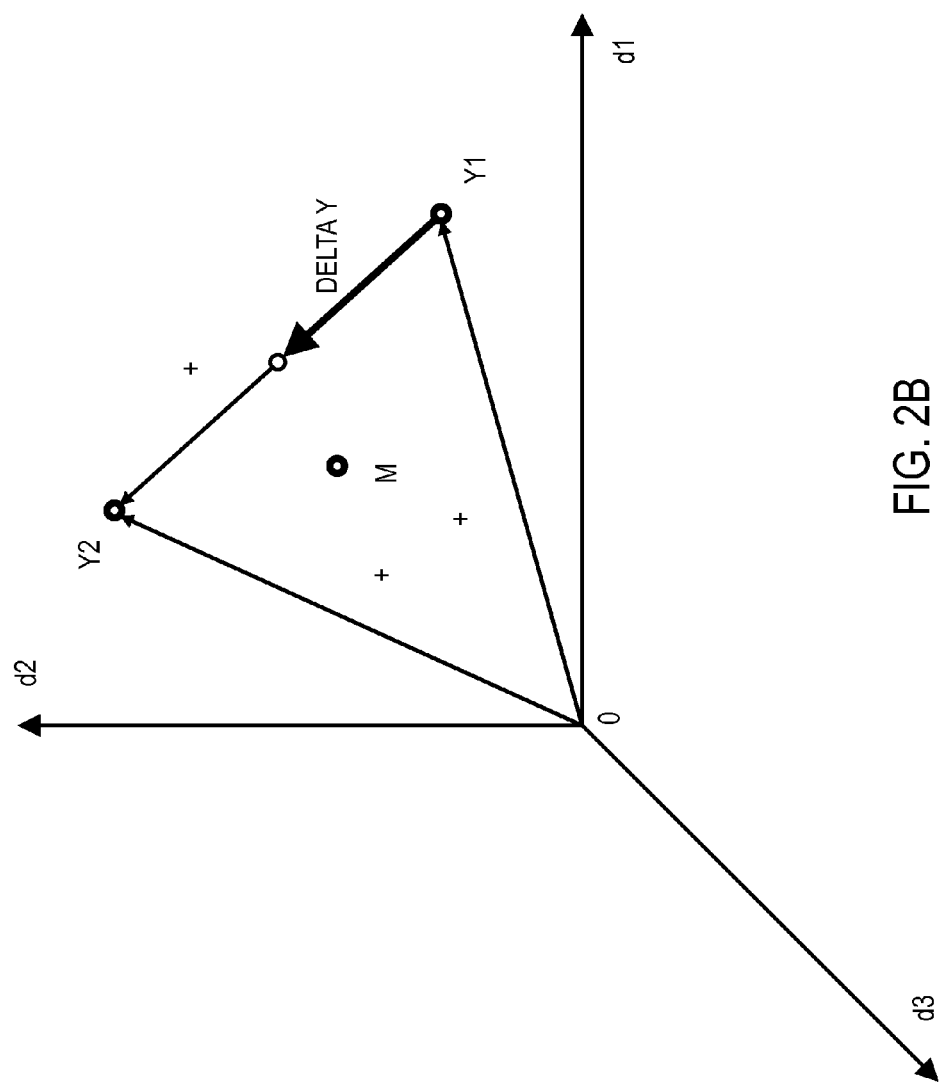
FIG. 2B depicts a model illustrating an optimal vector convergence for balancing traffic loads in relation to a target vector, in accordance with exemplary embodiments.
Figure 3:
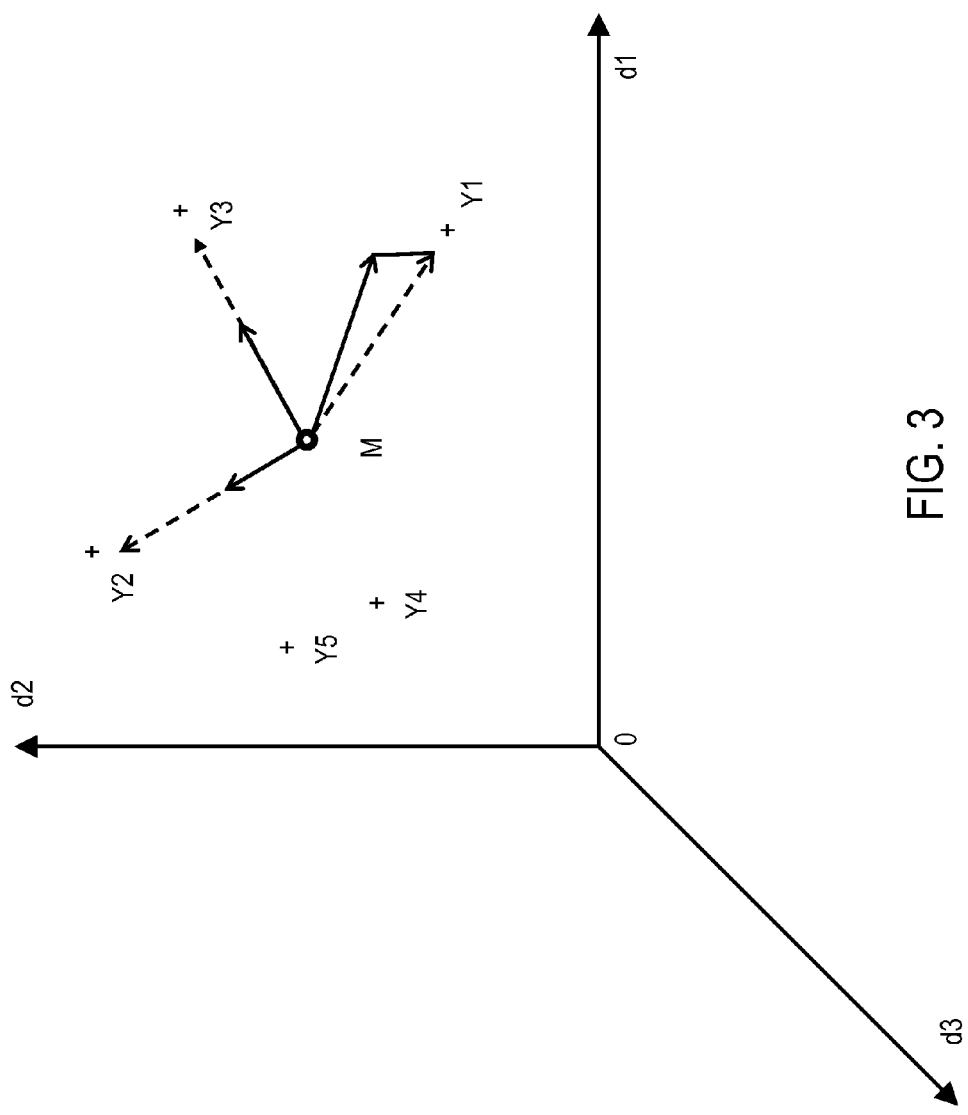
FIG. 3 depicts a model illustrating cancellation vector convergence and parallel vector convergence in load balancing by exchanging of vector elements, in accordance with exemplary embodiments.

FIGS. 4A-4D depict flow charts illustrating algorithms for dynamic load balancing using a load balancing scheme to load balance traffic flows from a plurality of terminals based on determined priority levels of the traffic flows from the plurality of terminals in a communications system, in accordance with exemplary embodiments, with reference to FIGS. 2A, 2B and 3. The flow charts of FIGS. 4A-4D are discussed herein with reference to and in relation to FIGS. 2A, 2B and 3 to describe and illustrate aspects of the methods and apparatus of the invention in exemplary embodiments.

The methods and apparatus, according to aspects of the invention, by reference to the exemplary embodiments are described with reference to FIGS. 4A-4D, in relation to load balancing of traffic loads of multiple priorities in Aloha channels, by way of example, although the aspects of the invention are not limited to Aloha channels, but apply broadly to communications channels in other communications networks, such as various satellite networks and computer networks, or combinations thereof. Also, the order of the process steps can vary, as well as the inclusion, omission or repetition of various steps can vary, and thus the exemplary embodiments and aspects of the invention should not be construed in a limiting sense.

An exemplary inroute load vector model for flow control in Aloha channels is depicted in FIG. 2A, in accordance with aspects of the invention. FIG. 2A depicts an inroute load vector model in a multidimensional space, illustrating inroute traffic loads in relation to a centroid point M as a load balancing target, in accordance with exemplary embodiments. The exemplary load vectors illustrated with respect to FIG. 2A have three priorities of load levels in the traffic loads, but can be readily generalized to extend multiple priorities of traffic loads, such as two or four or more priorities of load levels, for example.

Optimal vector convergence according to aspects of the invention is illustrated in FIG. 2B for balancing traffic loads in relation to a target vector, in accordance with an exemplary embodiments. Further, cancellation vector convergence and parallel vector convergence in load balancing by exchanging of vector elements is illustrated in FIG. 3, in accordance with exemplary embodiments.

Figure 4A:
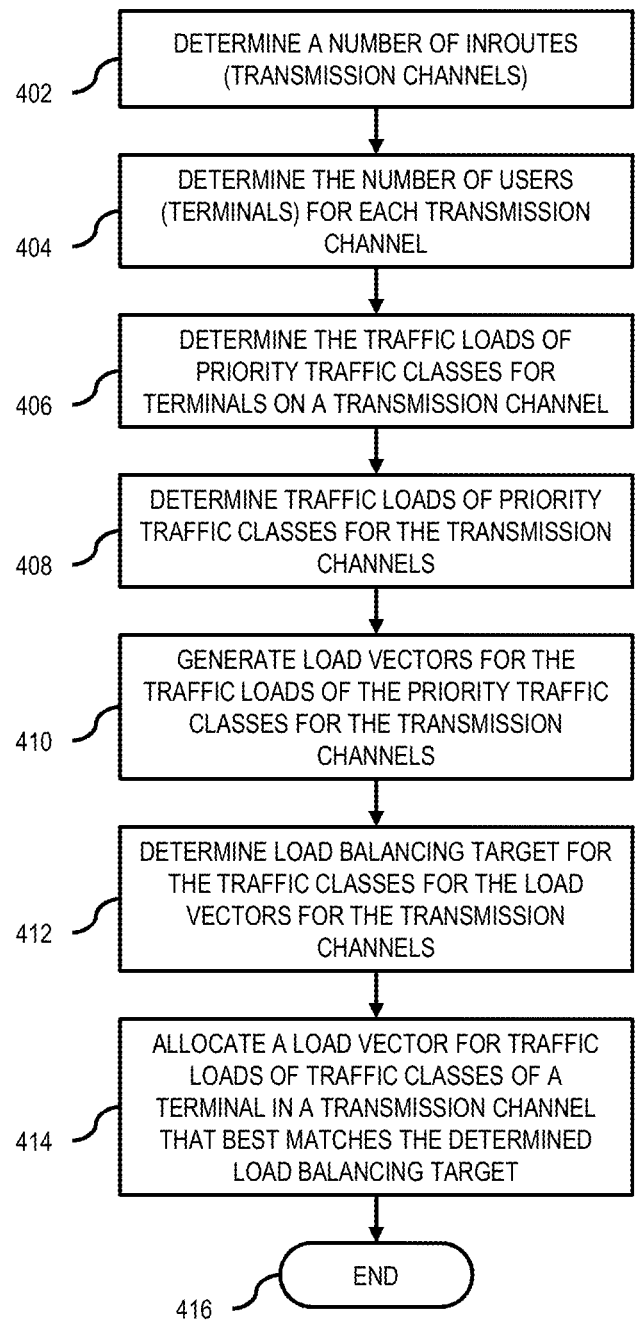
FIGS. 4A-4D depict flow charts illustrating algorithms for dynamic load balancing using a load balancing scheme to load balance traffic flows from a plurality of terminals based on determined priority levels of the traffic flows from the plurality of terminals in a communications system, in accordance with exemplary embodiments.

Aspects of the methods and apparatus for dynamic load balancing using a load balancing scheme to load balance traffic flows from a plurality of terminals based on determined priority levels of the traffic flows from the plurality of terminals in a communications system, in accordance with exemplary embodiments, are first generally presented with reference to the algorithm of FIG. 4A.

Referring to FIG. 4A, at Step 402, a controller in the communications system, such as at an inroute IGM associated with a gateway or a controller, such as including a processor, in a computer network, determines a number of inroutes, or available transmission channels, or communications channels, in a communications system, such as a satellite network or a computer network. The process then proceeds to Step 404 where the controller determines the number of users, terminals or transmission terminals, for each of available transmission, or communications, channels (such as shared communication channels for an overall traffic load). The process then proceeds to Step 406.

At Step 406, the controller determines the traffic loads of priority traffic classes for terminals on a transmission channel, and then at Step 408 determines traffic loads of priority traffic classes for the transmission channels. The process then proceeds to Step 410 where the controller generates load vectors for the traffic loads of the priority traffic classes for the transmission channels. The process then proceeds to Step 412 where the controller determines a load balancing target for the traffic classes for the load vectors for the transmission channels. The process then proceeds to step 414 where the controller allocates, or assigns, a load vector for traffic loads of traffic classes of a terminal in a transmission channel that best matches the determined load balancing target. The process then proceeds to end at Step 416, but can return to Step 402 to repeat the process for load balancing, such as at predetermined times.

Figure 4B:
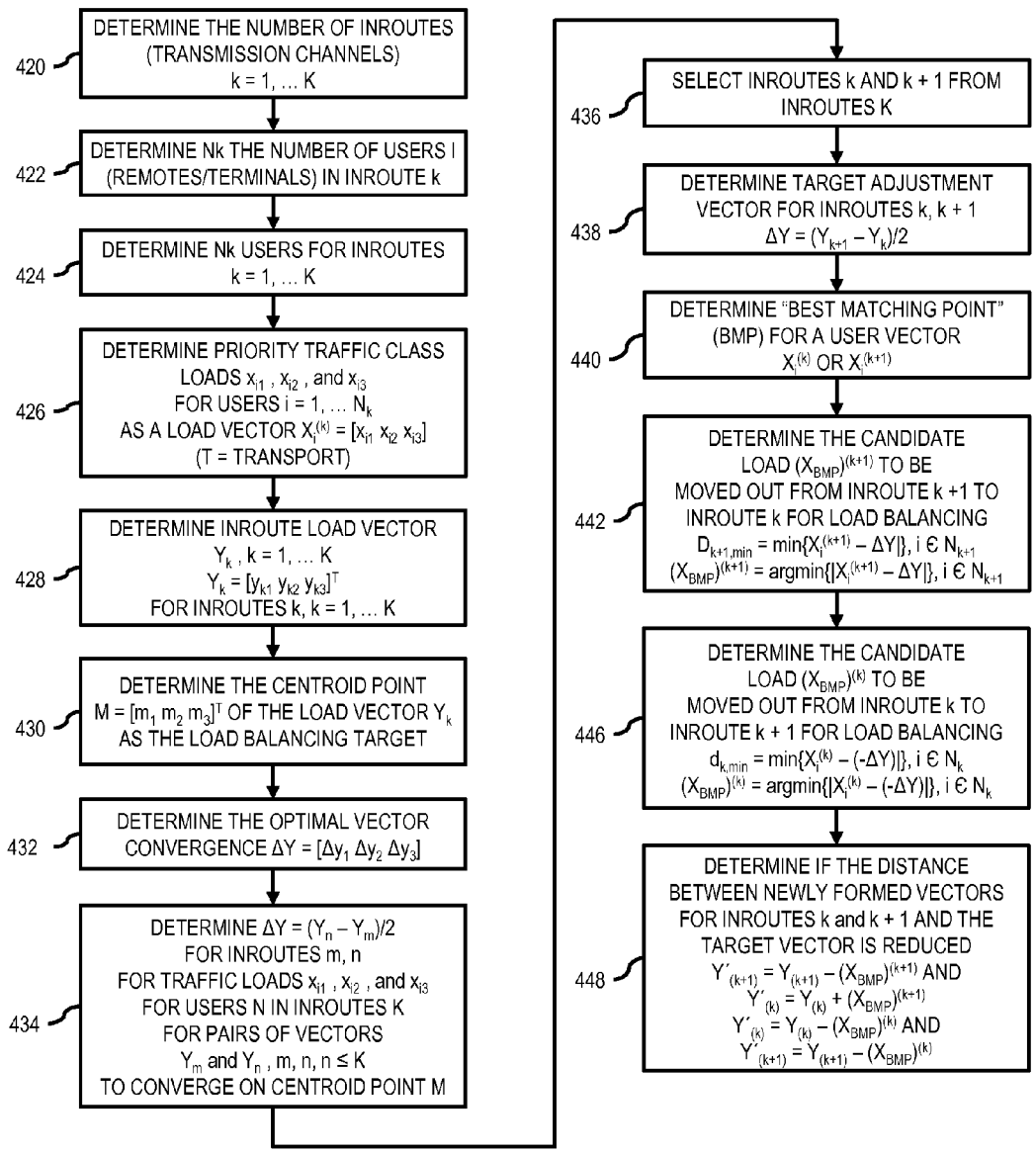

Referring to FIGS. 2A, 2B and 3 and the exemplary load balancing algorithm of FIG. 4B, aspects of the invention related to load balancing based on priority levels of traffic loads are described in relation to three types of priority traffic class, namely priorities 1, 2 and 3, representing interactive, streaming and bulk traffics, for example.

In the representation of the load vectors for traffic loads in FIG. 2A, $X_i^{(k)} = [x_{i1}\ x_{i2} x_{i3}]^T$ is a load vector for user i, i=1, ..., $N_k$ in inroute k, k=1, ..., K. K is the number of inroutes, or available transmission channels, and $N_k$ is the number of users (remotes) in inroute k. In the load vector $X_i^{(k)}$, $x_{i1}$, $x_{i2}$, and $x_{i3}$ are traffic loads in the priorities 1, 2 and 3, respectively, and "T" is the vector transport. In the algorithm for load balancing of FIG. 4B, a controller in the communications system determines the foregoing information at Steps 420-426. At Step 420, the controller determines the number of inroutes, or transmission, or communications, channels in the communications system. At Step 422, the controller determines the number of users in an inroute of the communications system. At Step 424, the controller determines the number of users for the inroutes in the communications system. Then, at Step 426 the controller determines priority traffic class loads for users as a load vector. The process then proceeds to Step 428.

At Step 428, the controller determines an inroute load vector $Y_k = [y_{k1} y_{k2} y_{k3}]^T$, which is generated by the controller as a load vector for the various inroutes k. In generating the inroute load vectors, at Step 428, for load vector $Y_k$, the loads for the various levels of load priorities are described as $$y_{k1} = \sum_{i=1}^{N_k} x_{i1},\ y_{k2} = \sum_{i=1}^{N_k} x_{i2}\ \text{and}\ y_{k3} = \sum_{i=1}^{N_k} x_{i3}. \tag{1}$$

The process then proceeds to Step 430, where a load balancing target for balancing the traffic loads of different priority levels for the traffic loads for a plurality of terminals is determined by the controller. Typically, at Step 430, the load balancing target determined is a centroid point $M=[m_1 m_2 m_3]^T$ for the generated load vectors, determined as $$m_1 = \sum_{k=1}^{K} y_{k1}/K, \; m_2 = \sum_{k=1}^{K} y_{k2}/K \text{ and } m_3 = \sum_{k=1}^{K} y_{k3}/K. \quad (2)$$

The coordinates of the centroid point M, as the load balancing target, based upon relations (1) and (2) above, determine the centroid point M as $$m_1 = \sum_{k=1}^{K} \sum_{i=1}^{N_k} x_{i1}/K, \; m_2 = \sum_{k=1}^{K} \sum_{i=1}^{N_k} x_{i2}/K \text{ and } m_3 = \sum_{k=1}^{K} \sum_{i=1}^{N_k} x_{i3}/K. \quad (3)$$

In relation (3) above, the numerators for relation (3) are the total amount of traffic load for each individual priority given a fixed number of remotes, terminals, and inroutes at certain time. Thus, the centroid point $M=[m_1 m_2 m_3]^T$ is constant for a given time, irrespective of how a remote terminal having a traffic load of various priorities is allocated across the inroutes or available transmission channels.

The inroute load vector $Y_k$, $k=1, \ldots, K$, is a sample point in a multi-dimensional space, as shown in FIG. 2A, where point M is the centroid point. From relation (3) above, centroid point M should be the load balancing target for different priorities, such as, for example, where all the users or terminals, are with the same service plan. In FIG. 2A, points Y1 and Y2 are two inroute load vector samples, together with some other load samples indicated by "+" in FIG. 2A.

According to aspects of the invention, a target for load balancing is that, by allocating (or exchanging) users, or terminals, with different load vectors, samples Y1 and Y2, as well as other samples, in the available inroute transmission channels, the resultant load vectors can move closer to centroid point M, or converge to centroid M, providing dynamic load balancing for loads of different priorities. Therefore, according to aspects of the invention, if all the samples converge to centroid point M, i.e., are sufficiently close to centroid point M, the summation of the distances from a sample point to M would be relatively very small for load balancing of the loads of different priorities. In determining the distances from the centroid point M, $r_k=|Y_k-M|$ is the Euclidian distance from $Y_k$ to M. Then, using the Euclidian distance, a distance based metric for the summation of the as distances from a sample point to M is determined as $$S = \sum_{k=1}^{K} r_k^2 = \sum_{k=1}^{K} |Y_k - M|^2. \quad (4)$$

As discussed above, the summation of the distances from a sample point to centroid point M should be relatively very small for load balancing of the loads of different priorities. Therefore, the distance based metric, the scalar S from relation (4) above, should be minimized, or made relatively small. In relation (4) above, the determination for the Euclidian distance from $Y_k$ to M squared can be expressed for loads of three priority levels from the following relation (5) as $$r_k^2 = |Y_k - M|^2 = \sum_{i=1}^{3} (y_{ki} - m_i)^2 = \quad (5)$$

$$\sum_{i=1}^{3} (y_{ki} - m_i)^2 = (y_{k1} - m_1)^2 + (y_{k2} - m_2)^2 + (y_{k3} - m_3)^2.$$

The process then proceeds to Step 432, where the controller determines an optimal vector convergence $\Delta Y = [\Delta y_1 \Delta y_2 \Delta y_3]^T$ for load balancing. In this regard, applying the above relations (4) and (5), load balancing of different priority loads for pairs of inroutes can be determined by generating a target vector $\Delta Y$ and target distance $\Delta S$. For example, for two load vectors $Y_m$ and $Y_n$, m, n$\leq$K, the target vector $\Delta Y = [\Delta y_1 \Delta y_2 \Delta y_3]^T$ represents a target vector for a remote terminal with corresponding traffic loads of multiple priority levels that is to be exchanged between inroute m to inroute n. The resultant load vectors for the exchange of the inroute traffic load between inroutes m and are represented as $Y'_m=Y_m+\Delta Y$ and $Y'_n=Y_n-\Delta Y$. Also, in determining the target distance $\Delta S$, S' in relation (6) below represents the updated total distance-squared after exchanging a user terminal between inroute m to inroute n, in the example. The difference before and after updating in exchanging the terminal load from inroute m to inroute n in relation to $\Delta S$, can be found by $$\Delta S = S' - S = |Y_m + \Delta Y - M|^2 - |Y_m - M|^2 + |Y_n - \Delta Y - M|^2 - |Y_n - M|^2. \quad (6)$$

Expanding relation (6), the target distance $\Delta S$ is expressed from the following relation (7) as $$\Delta S = \sum_{i=1}^{3} [2(y_{mi} - m_i)\Delta y_i + \Delta y_i^2] + \sum_{i=1}^{3} [-2(y_{ni} - m_i)\Delta y_i + \Delta y_i^2]. \quad (7)$$

For load balancing in exchanging a terminal load from inroute m to inroute n, the target distance $\Delta S$, in the example, is brought to a negative value by choosing the target vector $\Delta Y$ such that the overall distance is reduced. From relation (7) above it can be observed that the relation is in convex form in terms of $\Delta y_i$. As such, the optimal point for the load balancing can be achieved by setting partial derivatives $$\frac{\partial(\Delta S)}{\partial(\Delta y_i)} = 0,$$

i=1, 2, 3, wherein $$2(y_{m1}-m_1)+2\Delta y_1 - 2(y_{n1}-m_1)+2\Delta y_1 = 0$$

$$2(y_{m2}-m_2)+2\Delta y_2 - 2(y_{n2}-m_2)+2\Delta y_2 = 0$$

$$2(y_{m3}-m_3)+2\Delta y_3 - 2(y_{n3}-m_3)+2\Delta y_3 = 0.$$

Thus, at Step 434, the controller determines the target vector $\Delta Y$ for the load balancing can be expressed as follows from the following relations (8) and (9) as $$\Delta y_1 = \frac{y_{n1} - y_{m1}}{2}, \; \Delta y_2 = \frac{y_{n2} - y_{m2}}{2}, \text{ and } \Delta y_3 = \frac{y_{n3} - y_{m3}}{2}. \quad (8)$$

And, in a vector form, as $$\Delta Y = \frac{Y_n - Y_m}{2}. \quad (9)$$

Also, incorporating relation (8) into relation (7) above, the target distance $\Delta S$ can be expressed as follows $$\Delta S = \sum_{i=1}^{3} [2(y_{mi} - y_{ni})\Delta y_i + 2\Delta y_i^2] = \quad (10)$$

$$\sum_{i=1}^{3} [2(-2\Delta y_i)\Delta y_i + 2\Delta y_i^2] = -2\sum_{i=1}^{3} \Delta y_i^2 = -2|\Delta Y|^2 \leq 0.$$

Also, from relations (9) and (10) above it can be observed, for load balancing of different priority loads for pairs of inroutes by generating target vector $\Delta Y$ and target distance $\Delta S$, that
 (1) the optimal setting of $\Delta Y$ is half of the difference between the two vectors under consideration;
 (2) the optimal setting for any two vectors can decrease as the sum of distance squares; and
 (3) the decrease in sum is accelerated as $|\Delta Y|$ becomes larger.

Continuing with reference to FIG. 2B, dynamic load balancing as to traffic loads of different or multiple priority levels in relation to optimal vector convergence in relation to a target vector is further explained and illustrated, according to aspects of the invention. FIG. 2B depicts a model illustrating an optimal vector convergence for balancing traffic loads in relation to a target vector, in accordance with an exemplary embodiments. FIG. 2 illustrates an example of the optimal setting of $\Delta Y$. As illustrated in FIG. 2B, originally vectors $Y_1$ and $Y_2$ are far away from the centroid point M. By removing $\Delta Y$ from $Y_2$ and adding it to $Y_1$, both vectors reach a point that is closer to the centroid point M, as the load balancing target.

In general, according to aspects of the invention, typically the decrease of total distance $\Delta S$ is a function of $\Delta Y$. Therefore, it is desirable, according to aspects of the invention, to start with vectors for load balancing that have the largest separation in the space, i.e., the largest distance in between them. Such operation can be performed iteratively, according to aspects of the invention, and can be done from one pair of vectors to another. As vectors are being updated, new vector pairs with largest distance can be formed, thus providing the convergence procedure or operation, according to aspects of the invention. Typically, after a limited or predetermined number of iterations, particularly where the sample space is rich in relation to the number of sample points, the vectors for load balancing should by the iterative process, according to aspects of the invention, converge to the centroid point M, as the load balancing target.

In terms of two vectors, in the ideal space with a lot of sample points, it typically is not relatively hard to find the optimal vector $\Delta Y$ to balance the involving vectors. In practice, especially when there are not many samples, a number of iterative steps, such as described herein, typically are implemented to complete the forming of $\Delta Y$.

The process then proceeds to Step 436. At Step 436, of the available transmission inroutes or channels, the controller selects pairs of inroutes, such as inroutes k and k+1, where $X_i^{(k)} = [x_{i1} x_{i2} x_{i3}]^T$ is the load vector for user i, i=1, ..., $N_k$, in inroute k. According to aspects of the invention, for example, the controller selects a user i such that user load vector $X_i^{(k)}$ has the same direction and magnitude as $\Delta Y$, or the same direction with a fraction of magnitude. Such user selection rule, according to aspects of the invention, is applicable to the other vector (inroute load), as well, by flipping the direction of $\Delta Y$, the target adjustment vector.

The process then proceeds to Step 438. At Step 438, the controller determines the target adjustment vector $$\Delta Y = \frac{Y_{k+1} - Y_k}{2},$$

such as according to the above described relations. The process then proceeds to Step 440, where the controller determines a user vector $X_i^{(k)}$ or $X_i^{(k+1)}$ in either of the inroutes k or k+1, such that the distance between the user vector and the target vector is smallest. Such points with minimum distance to the target vector determined by the controller are referred to as "best matching points" (BMP). In conjunction with the controller determining the "best matching points" (BMP), the controller, at Step 442, determines the candidate load to be moved out from inroute k+1 to inroute k for load balancing.

The controller determines $N_k$ and $N_{k+1}$ as the number of users in inroutes k and k+1, respectively. The controller determines the selection of best matching point in inroute k+1 from the following relations as $d_{k+1,min} = \min\{|X_i^{(k+1)} - \Delta Y|\}, i \in N_{k+1}$, and $X_{BMP}^{(k+1)} = \operatorname{argmin}\{|X_i^{(k+1)} - \Delta Y|\}, i \in N_{k+1}$.

From the above relations, the controller determines $X_{BMP}^{(k+1)}$ is the candidate load to be moved out from inroute k+1 to inroute k for load balancing, according to aspects of the invention.

Also, in conjunction with the controller determining the "best matching points" (BMP), the controller, at Step 446, determines the candidate load to be moved out from inroute k to inroute k+1 for load balancing. The controller determines the selection of best matching point in inroute k from the following relations as $d_{k,min} = \min\{|X_i^{(k)} - (-\Delta Y)|\}, i \in N_k$, and $X_{BMP}^{(k)} = \operatorname{argmin}\{|X_i^{(k)} - (-\Delta Y)|\}, i \in N_k$.

From the above relations, the controller determines $X_{BMP}^{(k)}$ is the candidate load to be moved out from inroute k to inroute k+1 for load balancing, according to aspects of the invention.

The process then proceeds to Step 448. At Step 448, the controller verifies, before moving each of the above candidate load vectors, for example, that the distance between the newly formed vectors is actually reduced and the determination of the candidate loads to be moved is accurate from the determination. For example, at Step 448, the controller determines that for the determined candidate load $X_{BMP}^{(k+1)}$ that the relations $Y'_{k+1\ BMP} = Y_{k+1} - X_{BMP}^{(k+1)}$ and $Y'_k = Y_k + X_{BMP}^{(k+1)}$ provide a result that indicates that the distance is actually reduced. If so, the controller determines the candidate load $X_{BMP}^{(k+1)}$ is validated for movement from inroute k+1 to inroute k for load balancing, according to aspects of the invention. However, if the controller determines that the distance is not actually reduced in the above relations, the controller determines that the determined candidate load $X_{BMP}^{(k+1)}$ is not validated and does not move the candidate load from inroute k+1 to inroute k. And another candidate load can be selected and $X_{BMP}^{(k+1)}$ determined, as described above, or alternatively, as described below.

Similarly, the controller, at Step 448, performs the validation check for the determined candidate load $X_{BMP}^{(k)}$. In this regard, at Step 448, the controller determines that for candidate load $X_{BMP}^{(k)}$ that the relations $Y'_k = Y_k - X_{BMP}^{(k)}$ and $Y'_{k+1} = Y_{k+1} X_{BMP}^{(k)}$ a result that indicates that the distance is actually reduced. If so, the controller determines the candidate load $X_{BMP}^{(k)}$ is validated for movement from inroute k to inroute k+1 for load balancing, according to aspects of the invention. However, if the controller determines that the distance is not actually reduced in the above relations, the controller determines that the candidate load $X_{BMP}^{(k)}$ is not validated and does not move the candidate load from inroute k to inroute k+1. And another candidate load can be selected and $X_{BMP}^{(k)}$ determined, as described above or, alternatively, as described below.

As to finding the BMP for moving candidate loads between pairs of inroutes, or transmission channels, with an irregular sample space, i.e., lightly loaded system or very biased user load distribution, such qualified targeting vector can be difficult to determine. In such case, the inroute pair for the second largest distance should be formed to determine the candidate loads to be moved between the inroutes. Such iterative process typically is typically repeated for a certain predetermined amount of time until the total distance is within a predefined range or the maximum number of iterations is achieved, according to aspects of the invention. Also, where the number of inroutes is relatively large, there can be increased performing of the iterative process to determine the largest distance between inroute pairs for load balancing, according to aspects of the invention.

Also, according to aspect of the invention, candidate loads to be moved between pairs of inroutes, or transmission channels, can be determined by determining two vectors, which do not necessarily have the largest distance, but can cancel their difference to the centroid point M. One such process according to exemplary embodiments is that the controller, for each inroute load vector, determines the difference between the load vector and the centroid point M. The difference vectors will be compared by the controller to find the best opportunity for cancellation. If such cancellation exists (or achieved within a tolerant range), the two corresponding vectors form a so-called cancellation pair or match pair. Operations of finding the best matching point (BMP) can be implemented, according to aspects of the invention, in these pairs, wherein in the process, referred to as cancellation convergence, the load vectors both converge to the centroid point M.

According to the process of cancellation convergence, according to aspects of the invention, the controller iteratively converges by cancellation pairs the generated load vectors, in execution of the load balancing, determines for the inroute transmission channel load vectors a difference between the inroute load vector for a transmission channel and the centroid point M as a difference vector; and determines a cancellation pair for the inroute load vectors by comparing the determined difference vectors in relation to the centroid point M, whereby the determined difference vectors converge on the centroid point M at a distance within a predetermined range for a cancellation pair of inroute load vectors.

Further, in the cancellation convergence process, according to aspects of the invention, the controller, in execution of the load balancing, further determines a best matching point for load balancing in each of a pair of available transmission channels for assigning traffic flows from the terminals, wherein the controller in determining the best matching point generates a target adjustment vector for a pair of available transmission channels, and determines a terminal load vector for transmission in either of the pair of transmission channels where a distance between the target adjustment vector and a terminal load vector is within a minimum distance range; and assigns the traffic flow for the terminal load vector to the transmission channel based upon the determined best matching point.

Another such process, according to exemplary embodiments, is that the controller determines, for respective inroutes, or transmission channels, the difference between the inroute and the centroid point M. The controller uses such difference as the target vector for the inroute vector to approach, or converge, to the centroid point M. In this process, referred to as parallel convergence, according to aspects of the invention, the controller by comparing the user terminal vector in the inroute, a best matching point is determined so that the distance to the centroid point M is reduced. Such user vector will be taken out from the inroute for sharing with other inroutes.

According to aspects of the invention, where one such BMP can be determined, an inroute can remain as is, waiting for contribution of other candidate loads from other inroutes. In such interactive process, at respective iterations, the controller determines as to each inroute what terminal loads or terminal vectors will move out of the inroute, as unneeded, and determines what terminal loads or terminal vectors, will be taken into the inroute, as needed, for load balancing. After a predetermined amount of iterations in performing the iterative process of parallel convergence, the total distance with respect to the centroid point M is determined to be within the tolerance range, and thus, the load balancing, according to aspects of the invention, can be achieved.

In this regard, in the process of parallel convergence, according to aspects of the invention, the controller iteratively converges by parallel convergence the generated load vectors, in execution of the load balancing, and determines for each of the inroute transmission channel load vectors a difference between the inroute load vector for a transmission channel and the centroid point M as a target vector; and determines as a best matching point for a terminal load vector for transmission in an inroute transmission channel where a distance between the target vector for the inroute transmission channel and the terminal load vector is within a minimum distance tolerance range.

The above exemplary procedures and processes of cancellation convergence and parallel convergence, according to aspects of the invention, are illustrated, for example, in FIG. 3, which depicts a model illustrating cancellation vector convergence and parallel vector convergence in load balancing by exchanging of vector elements, in accordance with exemplary embodiments. In FIG. 3, the dotted vectors illustrate the vectors in their original position and the solid lined vectors illustrate the vectors after exchange of candidate loads for load balancing, according to aspects of the invention.

In the model of FIG. 3, load vectors Y1, Y2 and Y3 can contribute by moving out user or terminal load vectors so that their distances to the centroid point M are reduced. However, the illustrated load vectors Y4 and Y5 do not initially contribute. However, according to aspects of the invention, the contribution from load vector Y3 can be used for load vector Y4 as a BMP to reach centroid point M. Similarly, the contribution from load vector Y1 can be used for Y5 to reach centroid point M, as well. Thus, for example, according to aspects of the invention, load vector Y3 can form a match pair with load vector Y4, and load vector Y1 can form a pair with Y2 or Y5, for load balancing.

The above description of the method and apparatus of load balancing, according to exemplary embodiments and aspects of the invention are now further described in relation to FIGS.

4C and 4D, which illustrate exemplary algorithms for formation of match pairs of load vectors and vector swapping, for load balancing based on the above described processes of cancellation convergence, according to aspects of the invention. First, with reference to FIG. 4C, the exemplary process depicted in the flow chart in FIG. 4C illustrates algorithms for dynamic load balancing that include generating vector sets and determining match pairs, according to aspects of the invention.

Figure 4C:
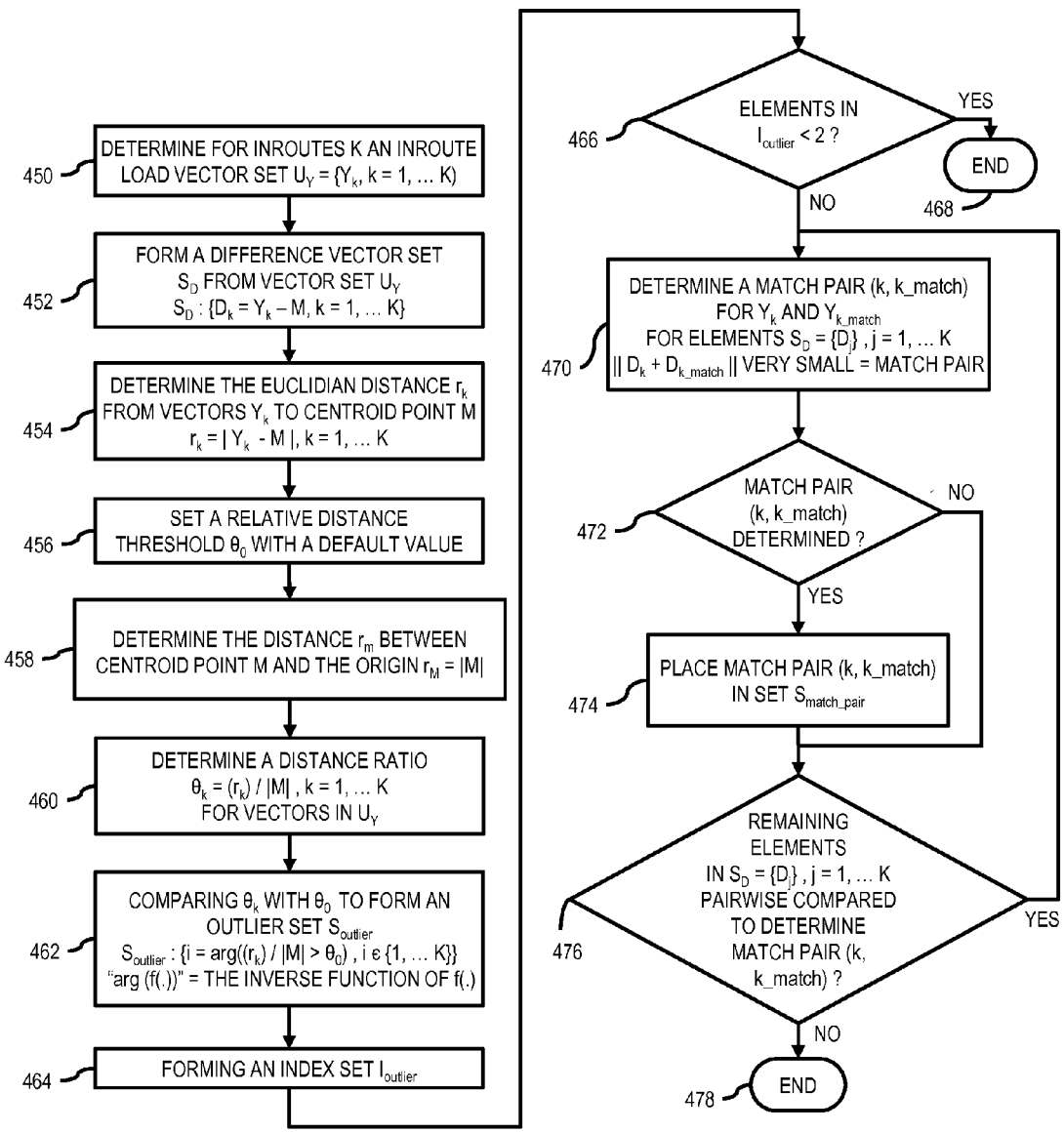

In the process of FIG. 4C, the controller in execution of the load balancing further generates an inroute transmission channel load vector set, the load vector set including the load vectors for the plurality of available transmission channels. The controller generates a difference vector set, the difference vector set including a plurality of difference vectors representing a difference between each of the vectors in the load vector set and the centroid point M. The controller also determines match pairs of the difference vectors in the generated difference vector set by iteratively comparing one and another of the difference vectors in relation to the centroid point M, wherein each match pair of the difference vectors is determined by a pair of difference vectors that converges on the centroid point M at a distance within a predetermined range so as to cancel their difference to the centroid point M; and generates a match pair set including each determined match pair of difference vectors.

Further, the controller, according to aspects and exemplary embodiments of the invention, in execution of the load balancing, further assigns the traffic flows from the terminals in the transmission channels corresponding to each determined match pair of difference vectors by load balancing terminal load vectors for the terminals between the transmission channels corresponding to a determined match pair.

In load balancing, according to aspects of the invention, load balancing is performed in the exemplary embodiments in relation to three dimensional vectors, corresponding to three levels of load priorities, as, for example, a load vector $X_1=(x_1y_1z_1)$ and a load vector $X_2=(x_2y_2z_2)$. Also, in load balancing, according to aspects of the invention, distances can be measured as a Euclidian distance, as previously described herein, or as a Normal distance, depending upon the load balancing process or application. For example, the Euclidian distance, according to aspects of the invention can be expressed in the following relation (11) as $$r^{Eud}=|X_1-X_2|=\sqrt{(x_1-x_2)^2+(y_1-y_2)^2+(z_1-z_2)^2}. \quad (11)$$

Additionally, for example, the Normal distance, according to aspects of the invention can be expressed in the following relation (12) as $$r^{Norm}=\|X_1-X_2\|=|x_1-x_2|+|y_1-y_2|+|z_1-z_2|. \quad (12)$$

Referring now to FIG. 4C, at Step 450, the controller determines an inroute load vector set $U_y=\{Y_k, k=1, \ldots, K\}$, wherein K is the number of inroutes, the centroid point is M, and $Y_k$ is an inroute load vector for inroute k. Centroid point M is a vector, the elements of which are specified in relation (3), as above described herein, according to aspects of the invention. The process then proceeds to Step 452, where the controller generates and forms a difference vector set, $S_D$: $\{D_k=Y_k-M, k=1, \ldots, K\}$. Then at Step 454, the controller determines the Euclidian distance from each vector $Y_k$ to the centroid point M, wherein the Euclidian distance is determined as $r_k=|Y_k-M|, k=1, \ldots, K$. The process then proceeds to Step 456, where the controller sets and determines a relative distance threshold $\theta_0$ with, for example, a default value $\theta_0=5\%$.

The process then proceeds to Step 458, where the controller determines the distance between the centroid point M and the origin, $r_M=|M|$. Then, at Step 460, the controller sets and determines a distance ratio $$\theta_k = \frac{r_k}{|M|},$$

$k=1, \ldots, K$, for load vectors in $U_y=\{Y_k, k=1, \ldots, K\}$. The process then proceeds to Step 462, where the controller determines and generates an outlier set, $S_{outlier}$, by comparing $\theta_k$ with $\theta_0$, according to aspects of the invention, expressed in the following relation (13) as $$S_{outlier}:\left\{i = \arg\left(\frac{r_k}{|M|} > \theta_0\right), i \in \{1, \ldots, K\}\right\}. \quad (13)$$

Where, in relation (13), "arg (f(.))" is the inverse function of f(.). The process then proceeds to Step 464, where the index of the outlier set $$S_{outlier}:\left\{i = \arg\left(\frac{r_k}{|M|} > \theta_0\right), i \in \{1, \ldots, K\}\right\}$$

is sorted in descending order in terms of $r_i$, forming an index set $I_{outlier}$. The process then proceeds to Step 466, where the controller decides whether the number of elements in $I_{outlier}$ is less than two. If so, the process then proceeds to end at Step 468, in that the process, in such case, according to aspects of the invention, typically does not exist a need for further load balancing. However, if, at Step 466, the controller determines the number of elements in $I_{outlier}$ is greater than two, the process then proceeds to Step 470.

At Step 470, the controller from the elements in the difference vector set $S_D=\{D_j\}$, $j=1, \ldots, K$, applies a pair wise comparison to determine two points that have a best cancellation effect, namely $Y_k$ and $Y_{k\_match}$, such that the Normal distance $\|D_k+D_{k\_match}\|$ is typically relatively very small, indicating a match pair of difference vectors, according to aspects of the invention. The process then proceeds to Step 472, where the controller decides, as a result of the comparison whether a match pair, (k, k_match), has been determined. If so, at Step 474, the controller places the match pair in a set $S_{match\_pair}$. And the process proceeds to Step 476.

However, if the controller decides that a match pair is not determined at Step 472, the process also proceeds to Step 476, and the controller does not place such pair of difference vectors in the set $S_{match\_pair}$. At Step 476 the controller then decides whether there are remaining elements in the difference vector set $S_D=\{D_j\}$, $j=1, \ldots, K$, for sets $\{D_k\}$. In this regard, if the controller determines there are no remaining elements for the pair wise comparison for a set $\{D_k\}$, the process proceeds to end at Step 478 as to a set $\{D_k\}$, but the process can return to Step 470 if other remaining sets $\{D_k\}$ in $S_D=\{D_j\}$, $j=1, \ldots, K$ remain for a determination of match pairs. Also, if the controller, at Step 476, decides that there are remaining elements in a set $\{D_k\}$ for a pair wise comparison to determine a match pair, the process returns to Step 470 to continue to explore set $\{D_k\}$ so that all the matched pairs can be found, according to aspects of the invention.

The foregoing steps in the exemplary process algorithms of FIG. 4C can be further described and explained in the following exemplary process for the formation of match pairs according to aspects of the invention, where an input $I_{outlier}$, $\{D_j, j=1, \ldots, K\}$ for the determination of match results in the output of a list of match pairs, $S_{match\_pair}$. The controller, in the exemplary process of FIG. 4C, determines index k, which is the top element in the sorted list $I_{outlier}$ for vector $Y_k$ where $D_k = Y_k - M$ and $D_i = Y_i - M$, with i being from the rest of the sorted list. The controller determines the distance $\|\Delta D_k\| = \|D_k + D_i\|$, $i \in I_{outlier}$, $i \neq k$. The controller also proceeds to determine k_match from the following relation (14) as $$k\_match = \operatorname{argmin}(\|D_k + D_i\|), i \in I_{outlier}, i \neq k \qquad (14)$$

wherein in relation (14) "argmin (.) is the inverse function of "minimum".

According to aspects of the invention, while the set $\{D_j\}$ could have more elements than that in the set $I_{outlier}$, only the index in $I_{outlier}$ typically is used for the determination of k_match. The controller determines and forms a match pair (k, k_match) and proceeds to store the match pair (k, k_match) in $S_{match\_pair}$. The controller then proceeds to update the set $I_{outlier}$ by removing k and k_match. The controller then proceeds to repeat the above procedure and process until no more match pair can be formed. According to aspects of the invention, the number of elements in the sorted list can be even or odd, but the elements in the match pair list must be even. Thus, according to aspects of the invention, a possible single left over element typically is not used in the output. For example, where there are 124 elements in $I_{outlier}$, then 62 match pairs can be formed. But if, for example, 125 elements exist in the sorted list $I_{outlier}$, there would be still 62 match pairs.

Figure 4D:
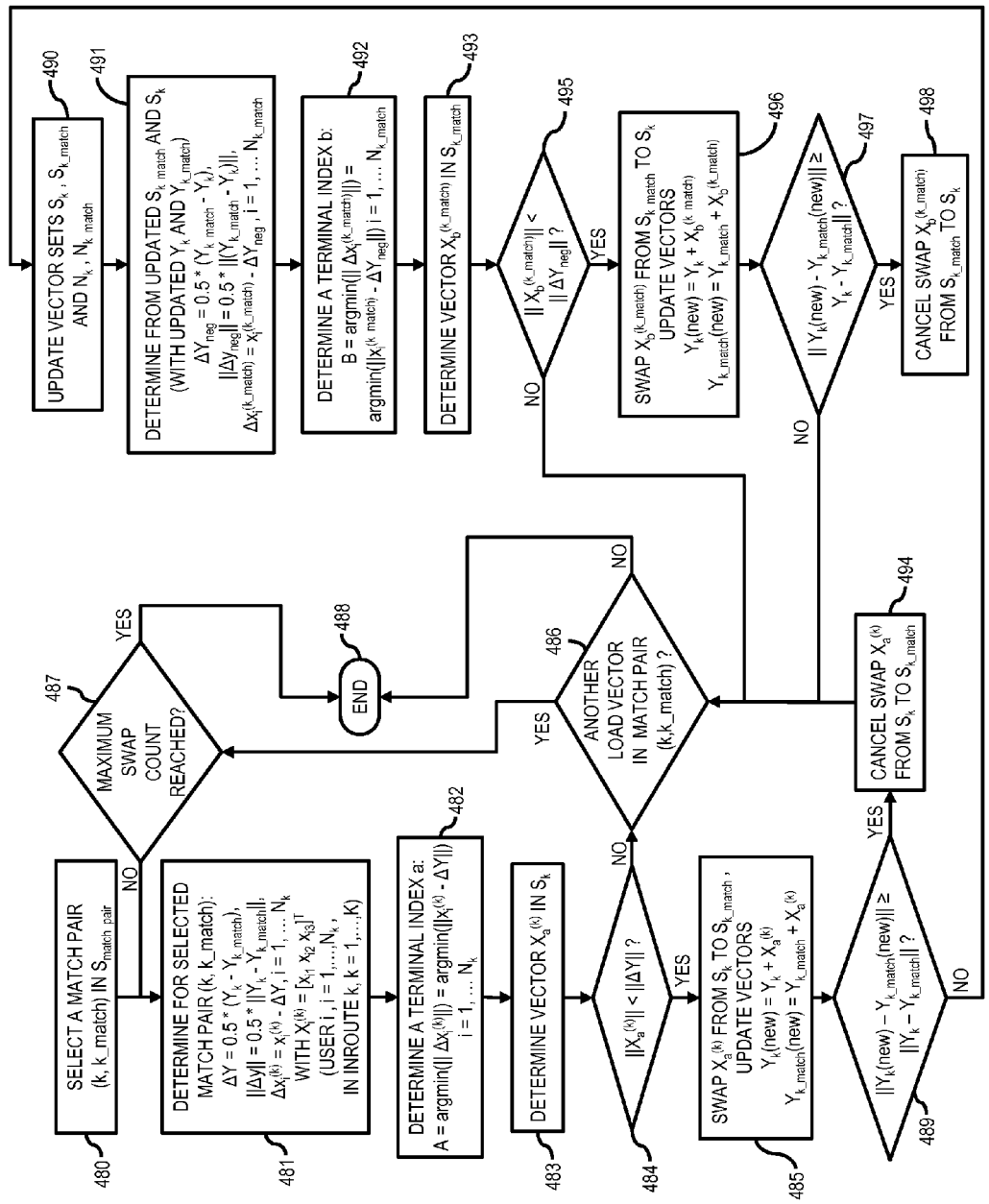

Continuing with reference to FIG. 4D, the exemplary process depicted in the flow chart in FIG. 4D illustrates algorithms for dynamic load balancing that include vector swapping of candidate loads from the generated match pairs, according to aspects of the invention.

In the process of FIG. 4D, in exemplary embodiments, the controller in execution of the load balancing further performs iteratively a terminal vector swap of the terminal load vectors in the inroute transmission channels that correspond to a determined match pair of difference vectors to load balance the terminal load vectors for the terminals between transmission channels corresponding to the determined match pair. According to aspects of the invention, the controller in performing the terminal vector swap generates a target adjustment vector for the pair of transmission channels corresponding to a determined match pair of difference vectors, determines a load vector adjustment distance for a terminal load vector in the pair of transmission channels corresponding to the determined matched pair, and determines the terminal load vector for transmission in a transmission channel of the pair of transmission channels corresponding to the determined match pair based upon the determined load vector adjustment distance in relation to a target adjustment vector distance for the target adjustment vector.

Continuing in the process of FIG. 4D, in exemplary embodiments, the controller in execution of the load balancing further performs iteratively, for the determined match pairs of difference vectors in the match pair set, the terminal vector swap for the terminal load vectors in the inroute transmission channels that correspond to a determined match pair of difference vectors, and assigns the traffic flows from the terminals in the transmission channels corresponding to the determined match pairs of difference vectors based upon the performed terminal vector swaps.

For each match pair in $S_{match\_pair}$, a terminal vector swap typically is performed, according to aspects of the invention. Further, according to exemplary embodiments, each match pair represents two inroutes with each including a number of terminals. The vector swap, according to aspects of the invention, is actually the exchange of terminals between the two involving inroutes, or transmission channels, whereby the terminal load in these two inroutes is balanced. Therefore, according to aspects of the invention, for a match pair (k, k_match) in $S_{match\_pair}$, the terminal vector swap of the terminal load vectors in the inroute transmission channels that correspond to a determined match pair (k, k_match) in $S_{match\_pair}$ of difference vectors is performed to load balance the terminal load vectors for the terminals between transmission channels corresponding to the determined match pair. Further, according to aspects and exemplary embodiments, the vector swapping typically only occurs in between two match-paired elements in $S_{match\_pair}$.

As described herein, in the exemplary process of FIG. 4D, $X_i^{(k)} = [x_{i1} x_{i2} x_{i3}]^T$ (T means vector transport) is a load vector for user i, i=1, \ldots, $N_k$, in inroute k, k=1, \ldots, K, where K is the number of inroutes and $N_k$ is the number of users (remotes) in inroute k, and $x_{i1}$, $x_{i2}$, $x_{i3}$ are traffic loads in priorities or priority levels 1, 2 and 3, respectively, for example. Also, $Y_k = [y_{k1} \, y_{k2} \, y_{k3}]^T$ is the load vector for inroute k, and a candidate load vector for load swapping is $S_k = \{X_i^{(k)}\}$.

The steps in the exemplary process algorithms of FIG. 4D for vector swapping, according to aspects of the invention, as described further herein, provide for vector swapping of terminal load vectors between two inroutes corresponding to a match pair of difference vectors where the exemplary process inputs are k, k_match, $S_k = \{X_i^{(k)}\}$, $S_{k\_match} = \{X_i^{(k\_match)}\}$, $Y_k$, $Y_{k\_match}$, and the centroid point M, and the outputs are $S_k(swap) = \{X_i^{(k)}\}_{swap}$, $S_{k\_match}(swap) = \{X_i^{(k\_match)}\}_{swap}$, and where the maximum number of swapping is set, for example, as Max_Swap_Count (default value=10, for example).

For example, the controller in execution of vector swapping for load balancing, according to exemplary embodiments, determines a variable representing the number of vector swaps from $S_k$ to $S_{k\_match}$ and sets the swap_count_a=0 for this variable. The controller also determines a variable representing the number of vector swaps from $S_{k\_match}$ to $S_k$, and sets the swap_count_b=0 for this variable. The controller also determines the total number of vector swaps to be performed for terminal load vectors in a match pair, and sets the total swap count total_swap_count=0 prior to the initial vector swap for a pair of match terminals.

Continuing with reference to FIG. 4D, the controller at Step 480 selects a determined match pair (k, k_match) in $S_{match\_pair}$ of difference vectors. The process then proceeds to Step 481, where the controller, according to exemplary embodiments, swaps a terminal load vector from $S_k$ to $S_{k\_match}$. The controller then determines and generates a target adjustment vector $\Delta Y$ for the pair of transmission channels corresponding to a determined match pair of difference vectors, whereby, for example, $\Delta Y = 0.5 * (Y_k - Y_{k\_match})$, $\|\Delta Y\| = 0.5 * \|Y_k - Y_{k\_match}\|$. The controller at Step 481 further determines, according to aspects of the invention, a candidate load vector for vector swapping as $\Delta X_i^{(k)} = X_i^{(k)} - \Delta Y$, i=1, \ldots, $N_k$. The process then proceeds to Step 482, where the controller, according to exemplary embodiments, determines a terminal index "a" as expressed in the following relation (15) as $$a = \operatorname{argmin}(\|\Delta X_i^{(k)}\|) = \operatorname{argmin}(\|X_{i(k)} - \Delta Y\|), i=1, \ldots, N_k, \qquad (15)$$

The process then proceeds to Step 483 where the controller, according to exemplary embodiments, determines a load vector $X_a^{(k)}$ in inroute, or transmission channel, $S_k$. The controller then, in exemplary embodiments, sets swap_indicator_a=0. The controller then proceeds to Step 484. At Step 484, the controller determines a load vector adjustment distance for a terminal load vector in the pair of transmission channels corresponding to a match pair, and determines the terminal load vector for transmission in a transmission channel of the pair of transmission channels corresponding to the determined match pair based upon the determined load vector adjustment distance in relation to a target adjustment vector distance for the target adjustment vector.

For example, in this regard, the controller, at Step 484, determines the load vector adjustment distance of the terminal load vector in relation to a target adjustment vector distance for the target adjustment vector as, for example, $\|X_a^{(k)}\| < \|\Delta Y\|$, with $\|X_a^{(k)}\|$ corresponding to the load vector adjustment distance and $\|\Delta Y\|$ corresponding to the target adjustment vector distance, in the example. The controller, at Step 484, decides whether the load vector adjustment distance in relation to the target vector adjustment distance satisfies the relation $\|X_a^{(k)}\| < \|\Delta Y\|$ as, for example, being within a valid range or at a valid value, such as based upon the aforementioned relation. If so, the controller, proceeds to Step 485, and proceeds to move, or swap the candidate load $X_a^{(k)}$ from inroute $S_k$ to inroute $S_{k\_match}$, and update the load vectors as follows $$Y_k(new) = Y_k - X_a^{(k)}$$

$$Y_{k\_match}(new) = Y_{k\_match} + X_a^{(k)}.$$

However, if at Step 484, the controller, determines that the load vector adjustment distance in relation to the target vector adjustment distance does not satisfy the relation $\|X_a^{(k)}\| < \|\Delta Y\|$ as, for example, not being within a valid range or at not a valid value, the controller then proceeds to Step 486, where the controller determines whether a remaining candidate load vector is available in match pair (k, k_match) of $S_{match\_pair}$ for determination of a vector swap. If not, the process proceeds to Step 488 and ends. However, if there is a remaining candidate load vector available in match pair (k, k_match) for a determination of a vector swap, the process proceeds to Step 487, where the controller determines whether a maximum swap count has been reached as to swapping load vectors in the pair of transmission channels or inroutes for the match pair. If so, the process proceeds to end at Step 488. However, if the maximum swap count has not been reached, the process returns to Step 481 and proceeds as described herein.

Continuing with reference to Step 485, if the controller, at Step 485, moved or swapped, the candidate load $X_a^{(k)}$ from inroute $S_k$ to inroute $S_{k\_match}$, and updated the load vectors, the process proceeds to Step 489. At Step 489, the controller compares the distance between the newly formed inroute vectors with the previous one, and if the controller determines there is no distance improvement, the controller reverses, i.e., cancels, the vector swapping for the candidate load vector. For example, at Step 489, the controller determines that the relation $\|Y_k(new) - Y_{k\_match}(new)\| \geq \|Y_k - Y_{k\_match}\|$ is true, indicating there is no distance improvement, the controller then proceeds to cancel the swapping. Where the controller determines to cancel the vector swapping for the candidate load vector, the process proceeds to Step 494 where the controller cancels the vector swap for the candidate load $X_a^{(k)}$ from inroute $S_k$ to inroute $S_{k\_match}$. The process from Step 494 then returns to Step 486 and proceeds as previously described herein.

However, if, at Step 489, the vector swapping for the candidate load was successful in that the relation $\|Y_k(new) - Y_{k\_match}(new)\| \geq \|Y_k - Y_{k\_match}\|$ is false, indicating there is a distance improvement resulting from the vector swapping for the candidate load $X_a^{(k)}$ from inroute $S_k$ to inroute $S_{k\_match}$, the process proceeds to Step 490. At Step 490, the controller updates the swap_indicator_a=1, updates the swap_count_a=swap_count_a+1, and updates vector sets $S_k$ and $S_{k\_match}$, and $N_k$, $N_{k\_match}$. From Step 490, the process proceeds to Step 491.

At Step 491, the controller from the updated terminal load vectors proceeds with the process to swap a terminal from updated $S_{k\_match}$ to updated $S_k$ (with updated $Y_k$ and $Y_{k\_match}$), according to aspects of the invention. The controller, at Step 491, then determines and generates a target adjustment vector $\Delta Y_{neg}$ for the pair of transmission channels corresponding to a determined updated match pair of difference vectors (updated $Y_k$ and $Y_{k\_match}$), whereby, for example, $\Delta Y_{neg} = 0.5*(Y_{k\_match} - Y_k)$, $\|\Delta Y_{neg}\| = 0.5*\|Y_{k\_match} - Y_k\|$. The controller, at Step 491, further determines, according to aspects of the invention, a candidate load vector for vector swapping as $\Delta X_i^{(k\_match)} = X_i^{(k\_match)} - \Delta Y_{neg}$, $i=1, \ldots, N_{k\_match}$. The process then proceeds to Step 492, where the controller, according to exemplary embodiments, determines a terminal index "b" as expressed in the following relation (16) as $$b = \operatorname{argmin}(\|\Delta X_i^{(k\_match)}\|) = \operatorname{argmin}(\|X_i^{(k\_match)} - \Delta Y_{neg}\|), i=1, \ldots, N_{k\_match}. \quad (16)$$

The process then proceeds to Step 493, where the controller, according to exemplary embodiments, determines a load vector $X_b^{(k\_match)}$ in inroute, or transmission channel, $S_{k\_match}$. The controller then, in exemplary embodiments, sets swap_indicator_b=0. The controller then proceeds to Step 495. At Step 495 the controller determines a load vector adjustment distance for a terminal load vector in the pair of transmission channels corresponding to the updated matched pair, and determines the terminal load vector for transmission in a transmission channel of the pair of transmission channels corresponding to the determined updated match pair based upon the determined load vector adjustment distance in relation to a target adjustment vector distance for the target adjustment vector.

For example, in this regard, the controller, at Step 495, determines the load vector adjustment distance of the terminal load vector in relation to a target adjustment vector distance for the target adjustment vector as, for example, $\|X_b^{(k\_match)}\| < \Delta Y_{neg}\|$, with $\|_b^{(k\_match)}\|$ corresponding to the load vector adjustment distance and $\|\Delta Y_{neg}\|$ corresponding to the target adjustment vector distance, in the example. The controller, at Step 495, decides whether the load vector adjustment distance in relation to the target vector adjustment distance satisfies the relation $\|_b^{k\_match)}\| < \|\Delta Y_{neg}\|$ as, for example, being within a valid range or at a valid value, such as based upon the aforementioned relation. If so, the controller proceeds to Step 496, and moves, or swaps, the candidate load $X_b^{(k\_match)}$ from inroute $S_{k\_match}$ to inroute $S_k$ and updates the load vectors as follows $$Y_k(new) = Y_k - X_b^{(k\_match)}$$

$$Y_{k\_match}(new) = Y_{k\_match} - X_b^{(k\_match)}.$$

However, if at Step 495, the controller, determines that the load vector adjustment distance in relation to the target vector adjustment distance does not satisfy the relation $\|X_b^{(k\_match)}\| < \|\Delta Y_{neg}\|$ as, for example, not being within a valid range or at not a valid value, the controller then proceeds to Step 486, where the controller determines whether a remaining candidate load vector is available in match pair (k, k_match) of $S_{match\_pair}$ for determination of a vector swap. If not, the process proceeds to Step 488 and ends. However, if there is a candidate load vector available in match pair (k, k_match) of $S_{match\_pair}$ for determination of a vector swap, the process proceeds to Step 487, where the controller determines whether a maximum swap count has been reached as to swapping load vectors in the pair of transmission channels or inroutes. If so, the process proceeds to end at Step 488. However, if the maximum swap count has not been reached, the process returns to Step 481 and proceeds as described herein.

Continuing with reference to Step 496, if the controller, at Step 496, moved or swapped, the candidate load $X_b^{(k\_match)}$ from inroute $S_{k\_match}$ to inroute $S_k$, and updated the load vectors, the process proceeds to Step 497. At Step 497 the controller compares the distance between the newly formed inroute vectors with the previous one, and if the controller determines there is no distance improvement, the controller reverses, i.e., cancels, the vector swapping for the candidate load vector. For example, at Step 497, the controller determines that the relation $\|Y_k(new)-Y_{k\_match}(new)\| \geq \|Y_k-Y_{k\_match}\|$ is true, indicating there is no distance improvement, the controller then proceeds to cancel the swapping. Where the controller determines to cancel the vector swapping for the candidate load vector, the process proceeds to Step 498, where the controller cancels the vector swap for the candidate load $X_b^{(k\_match)}$ from inroute $S_{k\_match}$ to inroute $S_k$. The process from Step 498 then returns to Step 486 and proceeds as previously described herein.

However, if, at Step 497, the vector swapping for the candidate load was successful in that the relation $\|Y_k(new)-Y_{k\_match}(new)\| \geq \|Y_k-Y_{k\_match}\|$ is false, indicating there is a distance improvement resulting from the vector swapping for the candidate load $X_b^{(k\_match)}$ from inroute $S_{k\_match}$ to inroute $S_k$, the controller, at Step 497, also updates the swap_indicator_b=1, updates the swap_count_b=swap_count_b+1, and updates vector sets $S_k$ and $S_{k\_match}$, and $N_k$, $N_{k\_match}$, as well as updating the total_swap_count=swap_count_a+swap_count_b. From Step 497, the process returns to Step 486 and proceeds as previously described herein.

The controller proceeds to return and repeat the above swapping process of FIG. 4D iteratively, according to aspects of the invention, from Step 481, until the controller determines no more swapping is possible, such as at Step 486, for example, where the controller determines there is no remaining candidate load vector available in match pair (k, k_match) of $S_{match\_pair}$ for determination of a vector swap, or as, for example, at Step 487, if the controller determines the maximum swap count is reached for a match pair, as, for example, where the swap_indicator_a=0 and swap_indicator_b=0; or the total_swap_count>=Max_Swap_Count.

Where the controller determines no further swapping is possible for a match pair, as described herein, the controller then, according to aspects of the invention, updates $S_k(swap) = \{X_i^{(k)}\}_{swap}$, $S_{k\_match}(swap) = \{X_i^{(k\_match)}\}_{swap}$ and exits the process of FIG. 4D of vector swapping between a match pair, according to aspects of the invention. The controller then proceeds to select another match pair in $S_{match\_pair}$ and the process for vector swapping, as described herein in relation to FIG. 4D, again proceeds from Step 480 and a terminal vector swap typically is performed, according to aspects of the invention. According to exemplary embodiments and aspects of the invention, the above described swapping procedure and process of FIG. 4D typically is run for every match pair in $S_{match\_pair}$.

Referring now to FIGS. 5-9, depicted therein are graphs illustrating and demonstrating load balancing performance in accordance with aspects of the methods and apparatus for load balancing traffic loads of different priorities based on determined priority levels of the traffic flows from a plurality of terminals in a communications system, such as implemented by the exemplary algorithms of the flow charts of FIGS. 4A-4D, in accordance with exemplary embodiments.

FIGS. 5-9 illustrate implementations of exemplary embodiments and aspects of the invention relating to simulation results demonstrating advantageous performance of dynamic load balancing of traffic loads of multiple priorities. The simulation parameters used included 140 inroutes, or transmission channels, with an initial number of load terminals in each inroute being 100, and with traffic loads including three (3) priority levels. The load distribution of each priority level had a uniform distribution between a normalized load of 12 to 18 (average=10). Also, the distance threshold $\theta_0$=0, for the simulation and the swap count was set to be relatively large, i.e., the Max_Swap_Count being set at, for example, 200. FIGS. 5-9 are now discussed to illustrate the results of load balancing of the multiple priority loads, according to aspects of the invention.

Figure 5:
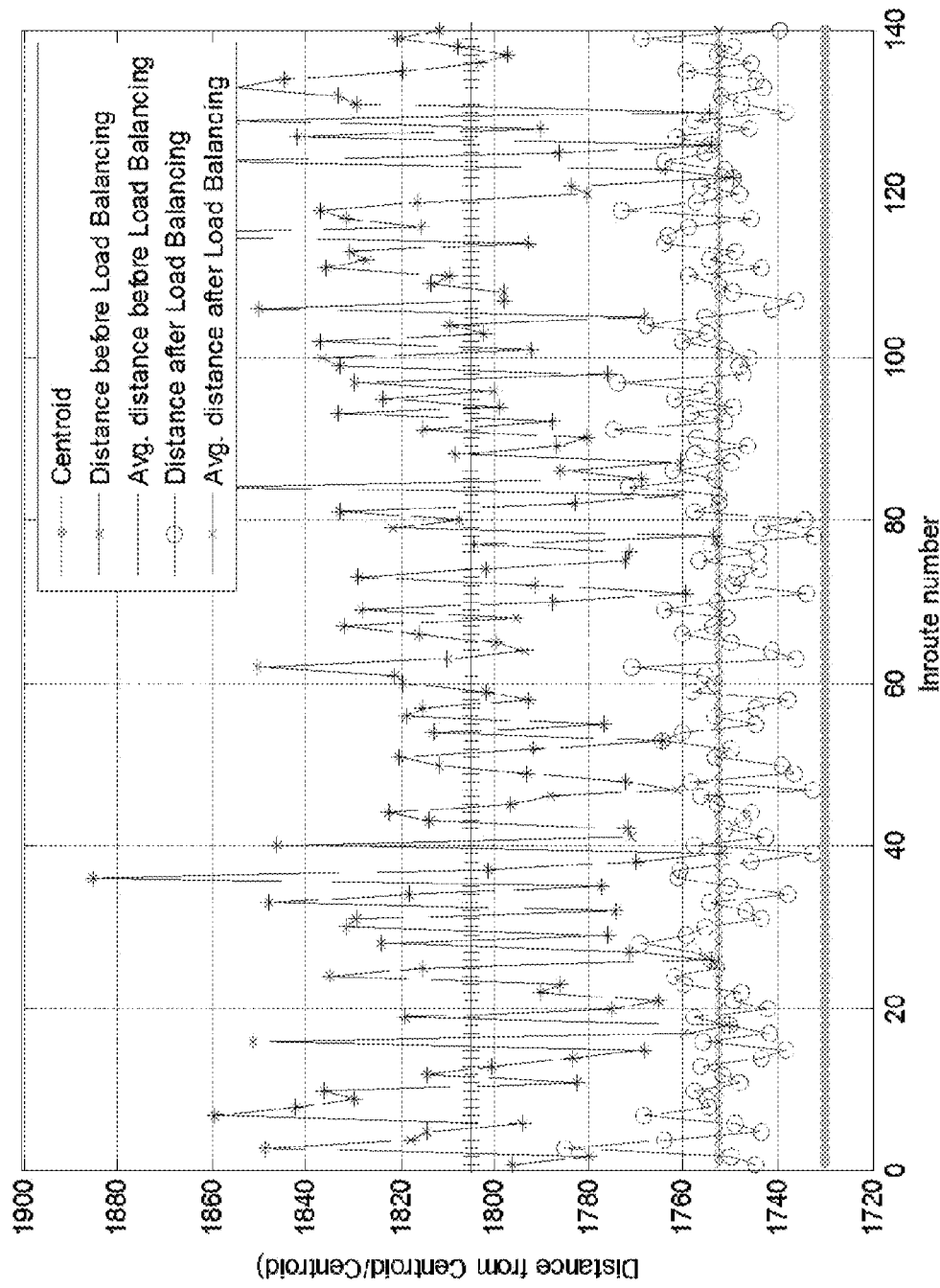
FIGS. 5-9 depict graphs illustrating and demonstrating load balancing performance in accordance with aspects of the methods and apparatus for load balancing traffic loads of different priorities based on determined priority levels of the traffic flows from a plurality of terminals in a communications system, such as implemented by the exemplary algorithms of the flow charts of FIGS. 4A-4D, in accordance with exemplary embodiments.
Figure 6:
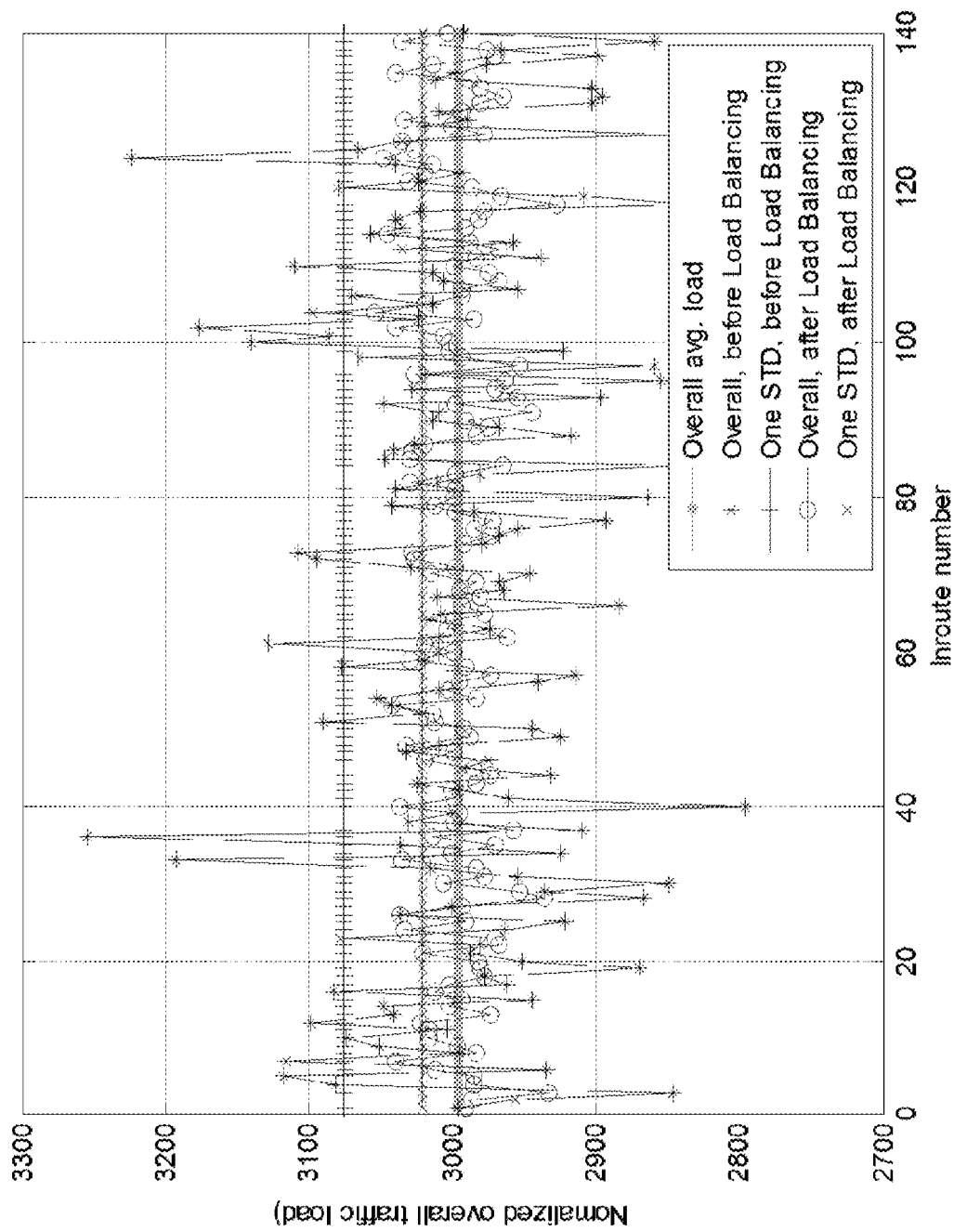
Figure 7:
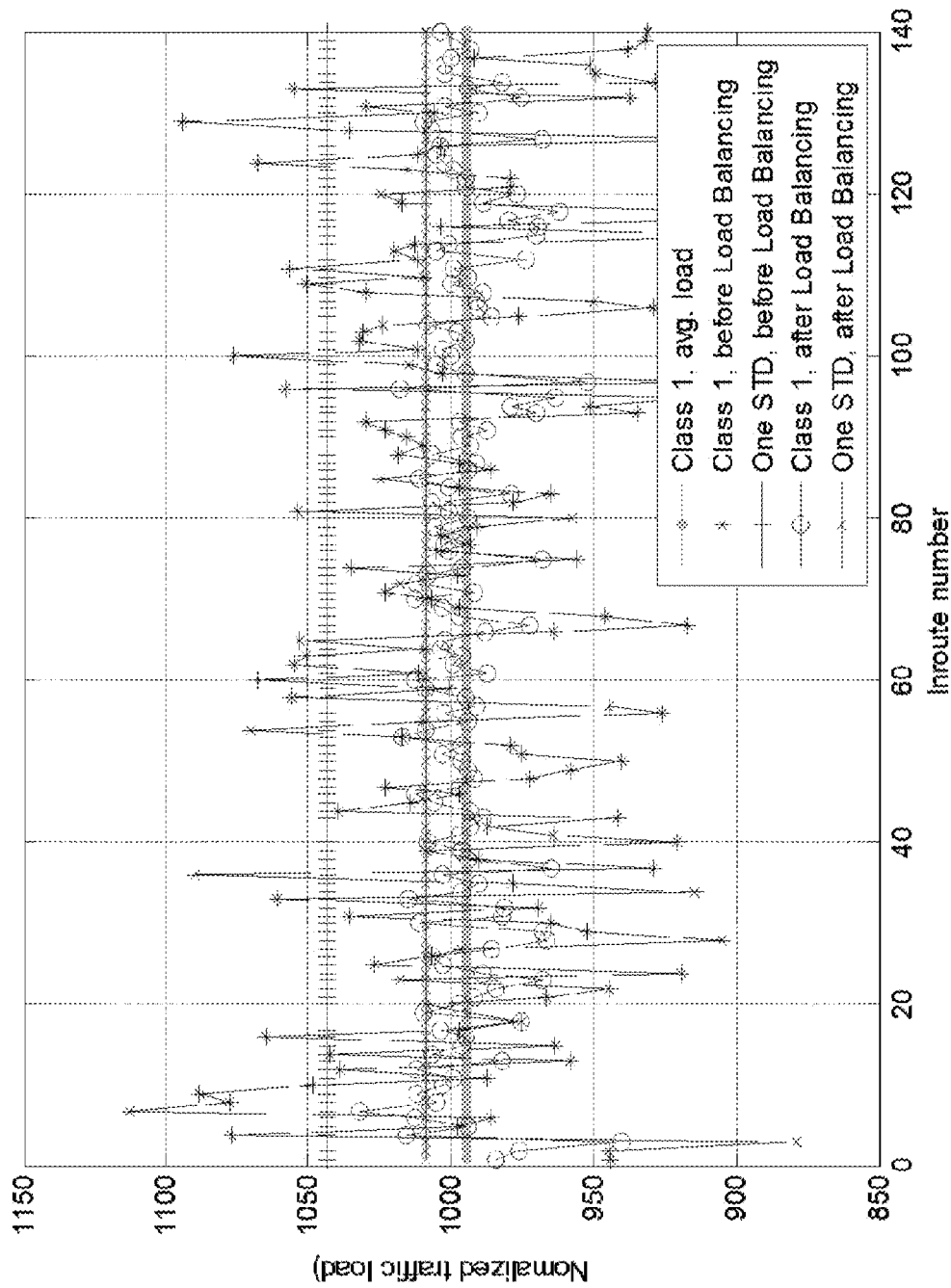
Figure 8:
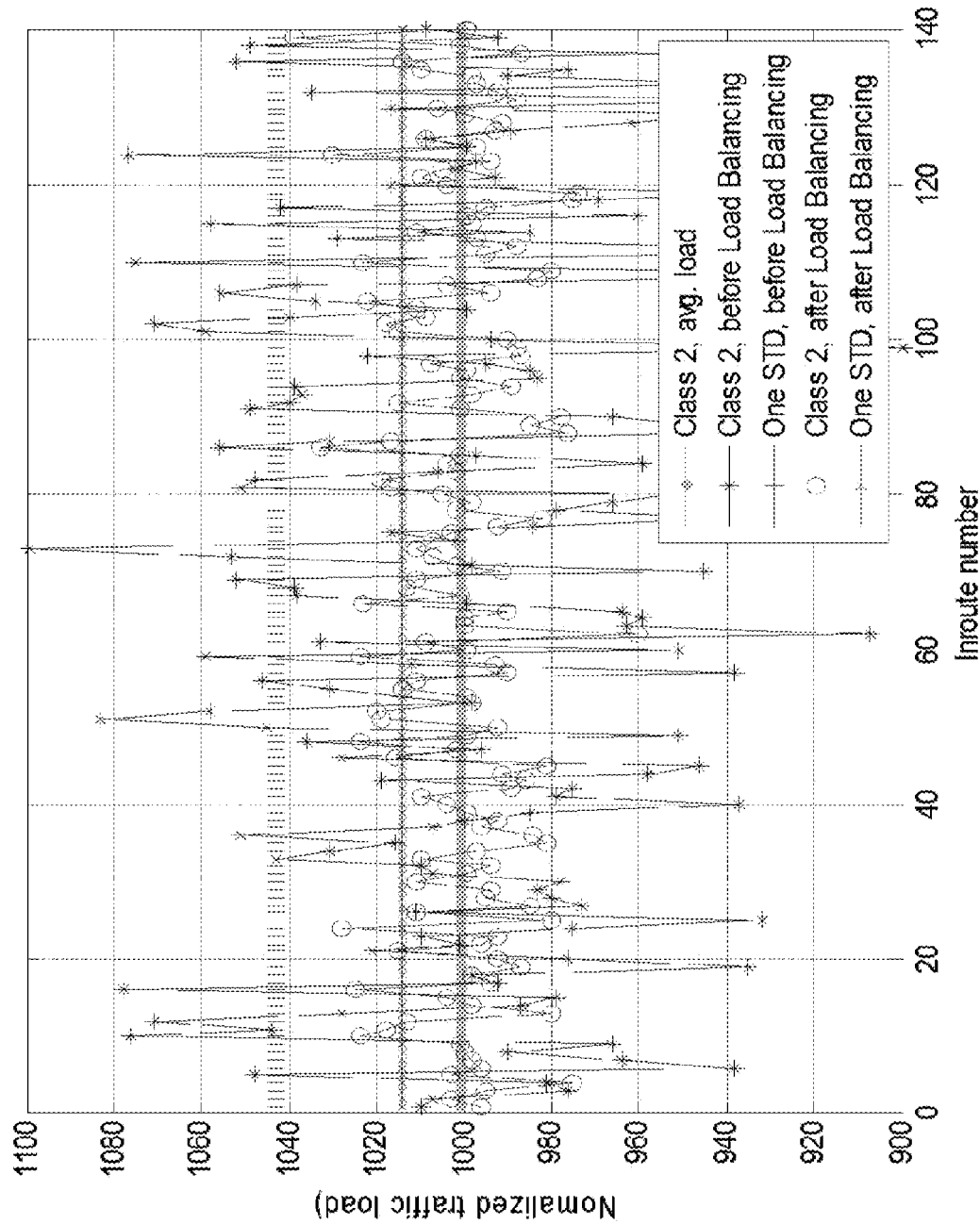
Figure 9:
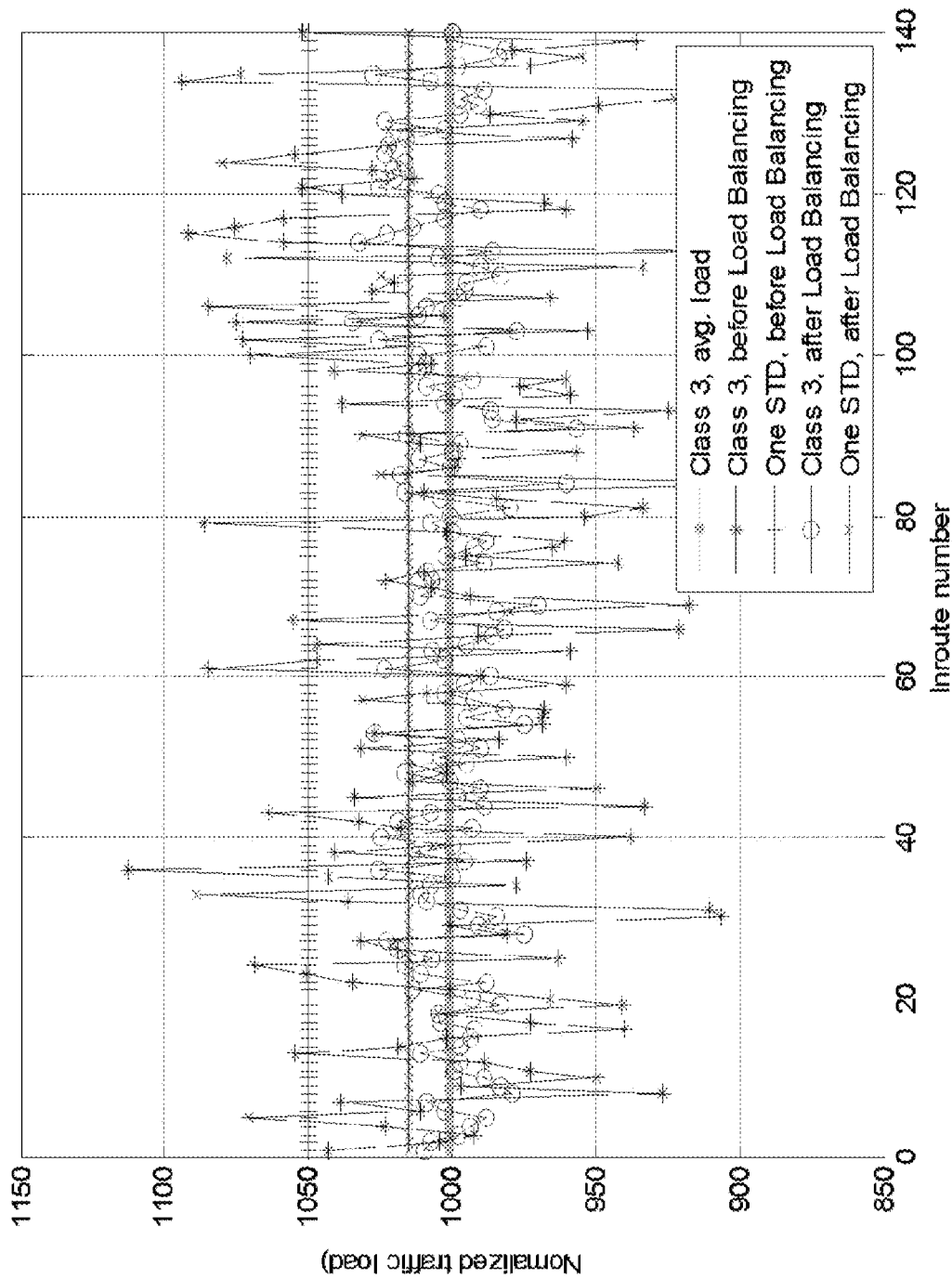

FIG. 5 illustrates the Euclidian distance from an inroute to the centroid for load balancing. From FIG. 5, it can be observed that the distance to the centroid point M is significantly reduced after load balancing, with an average distance decreased by about 70%. FIG. 6 illustrates an overall load profile for each inroute for load balancing. From FIG. 6, it can be observed that the standard deviation (STD) for the overall load is decreased by about 70% (from about 70 to 20). In FIGS. 7-9, the load profiles for the exemplary three priority classes of traffic loads for the inroutes are illustrated. From FIG. 7-9, it can be observed that for each priority class, the standard deviation of the load across the inroutes is reduced by about 70% after load balancing. It is also noted that, for example, that given 100 terminals in each inroute, the largest number of swap counts were about seven in one direction, with total counts around 10 as a maximum.

FIG. 10 illustrates an exemplary chip set, or controller, 1000 in or upon which exemplary embodiments according to and aspects of the invention can be implemented, such as a controller for controlling traffic load in a communications system, the controller including a processor for performing operations and processing information for traffic load control in the communications system, a memory for storing information and instructions for execution by the processor, and a communications interface for communications of data or information to or from the controller, such as for load balancing traffic loads of multiple priorities over inroutes, or transmission channels, such as random access channels, e.g., Aloha channels, such as in satellite or computer network communications systems. Chip set 1000 includes, for instance, processor and memory components described with respect to FIG. 10 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one exemplary embodiment, the chip set 1000 includes a communications mechanism such as a bus 1001 for passing information among the components of the chip set 1000 or to or from the outside of the controller or chip set. A processor 1003 has connectivity to the bus 1001 to execute instructions and process information stored in, for example, a memory 1005. The processor 1003 can include one or more processing cores with each core configured to perform independently. A multi-core processor enables multiprocessing within a single physical package. Examples of a multi-core processor include two, four, eight, or greater numbers of processing cores. Alternatively or in addition, the processor 1003 can include one or more microprocessors configured in tandem via the bus 1001 to enable independent execution of instructions, pipelining, and multithreading. The processor 1003 can also be accompanied with one or more specialized components to perform certain processing functions and tasks such as one or more digital signal processors (DSP) 1007, and/or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purpose processor. Other specialized components to aid in performing the inventive functions and aspects described herein include one or more field programmable gate arrays (FPGA) (not shown), one or more controllers, or one or more other special-purpose computer chips.

The processor 1003 and accompanying components have connectivity to the memory 1005 via the bus 1001. The memory 1005 includes both dynamic memory (e.g., RAM) and static memory (e.g., ROM) for storing executable instructions that, when executed by the processor 1003 and/or the DSP 1007 and/or the ASIC 1009, perform the processes of exemplary embodiments as described herein. The memory 1005 also stores the data associated with or generated by the execution of the processes.

Figure 11:
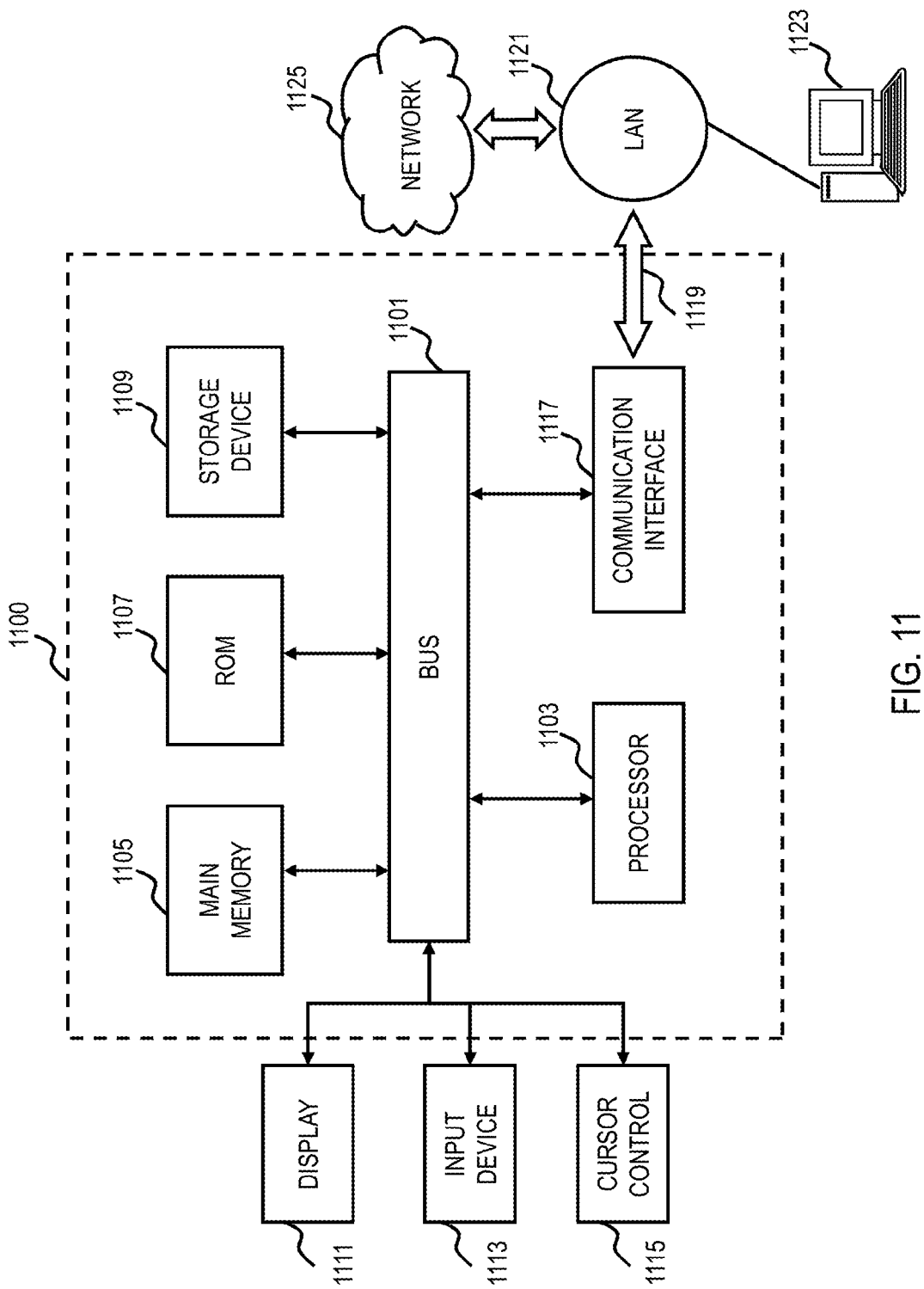
FIG. 11 depicts a diagram of a computer system in which architectures, apparatus and methods for dynamic load balancing of traffic loads of traffic flows from a plurality of terminals based on determined priority levels of the traffic flows from the plurality of terminals in a communications system can be implemented, according to exemplary embodiments.

FIG. 11 illustrates a computer system, or controller, 1100 upon which exemplary embodiments according to the present invention can be implemented, such as a controller for controlling traffic load in a communications system, the controller including a processor for performing operations and processing information for traffic load control in the communications system, a memory for storing information and instructions for execution by the processor, and a communications interface for communications of data or information to or from the controller, such as for load balancing traffic loads of multiple priorities over inroutes, or transmission channels, such as random access channels, e.g., Aloha channels, such as in satellite or computer network communications systems. The computer system 1100 includes a bus 1101 or other communications mechanism for communicating information, and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions to be executed by the processor 1103. The computer system 1100 further includes a read only memory (ROM) 1107 or other static storage device coupled to the bus 1101 for storing static information and instructions for the processor 1103. A storage device 1109, such as a magnetic disk or optical disk, is additionally coupled to the bus 1101 for storing information and instructions.

The computer system 1100 can be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is cursor control 1115, such as a mouse, a trackball, or cursor direction keys for communicating direction information and command selections to the processor 1103 and for controlling cursor movement on the display 1111.

According to aspects of exemplary embodiments of the invention, dynamic and flexible architectures, apparatus and methods for implementing load balancing for traffic loads for multiple priorities, in accordance with exemplary embodiments, are provided by the computer system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement can also be employed to execute the instructions contained in main memory 1105. In alternative embodiments, hard-wired circuitry can be used in place of or in combination with software instructions to implement embodiments and aspects of the invention. Thus, embodiments of the present invention are not limited to any specific combination of hardware circuitry and software.

The computer system 1100 also includes a communications interface 1117 coupled to bus 1101. The communications interface 1117 provides a two-way data communications, such as coupling to a network link 1119 connected to a local network 1121 or to or from remote terminals or controllers of communications systems. For example, the communications interface 1117 can be a digital subscriber line (DSL) card or modem, an integrated services digital network (ISDN) card, a cable modem, or a telephone modem to provide a data communications connection to a corresponding type of telephone line. As another example, communications interface 1117 can be a local area network (LAN) card (e.g., for Ethernet or an Asynchronous Transfer Model (ATM) network) to provide a data communications connection to a compatible LAN. Wireless links, such as for satellite communications systems, can also be implemented. In any such implementation, communications interface 1117 sends and receives electrical, electromagnetic, or optical signals that carry digital data streams representing various types of information. Further, the communications interface 1117 can include peripheral interface devices, such as a Universal Serial Bus (USB) interface, a PCMCIA (Personal Computer Memory Card International Association) interface, etc.

The network link 1119 typically provides data communications through one or more networks to other data devices. For example, the network link 1119 can provide a connection through local network 1121 to a host computer 1123, which has connectivity to a network 1125 (e.g., a wide area network (WAN) or the global packet data communications network now commonly referred to as the "Internet") or to data equipment operated by service provider. The local network 1121 and network 1125 both use electrical, electromagnetic, or optical signals to convey information and instructions. The signals through the various networks and the signals on network link 1119 and through communications interface 1117, which communicate digital data with computer system 1100, are exemplary forms of carrier waves bearing the information and instructions.

The computer system 1100 can send messages and receive data, including program code, through the network(s), network link 1119, and communications interface 1117. In the Internet example, a server (not shown) can transmit requested code belonging to an application program for implementing an embodiment of the present invention through the network 1125, local network 1121 and communications interface

1117. The processor 1103 can execute the transmitted code while being received and/or store the code in storage device 1109, or other non-volatile storage for later execution. In this manner, computer system 1100 can obtain application code in the form of a carrier wave.

The term "computer-readable medium" as used herein refers to any medium that participates in providing instructions to the processor 1103 for execution. Such a medium can take many forms, including but not limited to non-volatile media, volatile media, and transmission media. Non-volatile media include, for example, optical or magnetic disks, such as storage device 1109. Volatile media include dynamic memory, such as main memory 1105. Transmission media include coaxial cables, copper wire and fiber optics, including the wires that comprise bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media can be involved in providing instructions to a processor for execution. For example, the instructions for carrying out at least part of the present invention can initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by a processor.

The above described exemplary embodiments of methods and apparatus have been described in relation to aspects of the invention related to load balancing with traffic loads of multiple priorities, such as for channel load balancing, such as in a satellite network. The methods and apparatus, according to aspects of the invention, implement load balancing, such dynamic load balancing, for example, using a load balancing scheme to load balance traffic flows from a plurality of terminals based on determined priority levels of the traffic flows from the plurality of terminals in a communications system, such as described herein, based on vector convergence in a multi-dimensional space that advantageously promotes a relatively fast and effective convergence for dynamically balancing multiple priority loads of relative complexity.

The methods, apparatus and aspects of the invention can have applicability to any of various communications or computer networks that are capable of processing multiple tasks with multiple priorities and share processing resources, as well as can have applicability in any network systems with multiple priority traffic data sharing the network resource. As an example, the methods, apparatus and aspects of the invention can be utilized in a communications system that employs bandwidth allocation methods in a time division multiplex system, such as where a plurality of endpoints are contending for bandwidth and the users have different and dynamically changing traffic and quality of service needs. Also, the methods, apparatus and aspects of the invention have applicability to any of various computer systems and computer networks where multiple servers process tasks with different priorities. Additionally, various aspects of the exemplary methods and apparatus and aspects of the invention described herein can be implemented in the Jupiter Satellite System and its variants, for example.

In the preceding specification, various exemplary embodiments and aspects of the invention have been described with reference to the accompanying drawings. By way of example, dynamic load balancing of traffic loads having multiple priorities or priority levels has been discussed with particular reference to a satellite network communications system, such as utilizes Aloha channels, according to aspects and exemplary embodiments of the invention. It will, however, be evident that various modifications and changes can be made thereto, and additional embodiments can be implemented, without departing from the broader scope of the invention as set forth in the claims that follow. The specification and drawings are accordingly to be regarded in an illustrative rather than restrictive sense.

What is claimed is:

1. A method comprising:
determining a traffic load for data traffic of each of one or more traffic flows of a communications system, wherein the traffic load is determined as a load vector in a multidimensional space reflecting a traffic load for each of a plurality of priority levels of the data traffic of the respective traffic flow;
determining a channel load for each of a plurality of channels of the communications system as a channel load vector in the multidimensional space reflecting data traffic loads to be carried by the channel for each of the priority levels;
determining a load balancing target, based at least in part on the channel load vectors, to load balance the traffic flows over the channels of the communications system, wherein the load balancing target comprises a centroid point for the channel load vectors; and
assigning one or more of the traffic flows to each channel, based at least in part on the respective traffic loads of the one or more traffic flows, in a manner to converge the respective channel load to the load balancing target by iteratively determining cancellation pairs for the channel load vectors for the respective channel; and
wherein the iterative determination of the cancellation pairs comprises determining a matching point for each of a pair of channels, wherein the determination of the matching point comprises generating a target adjustment vector for each of the pair of channels, and determining a load vector for transmission of at least one of the traffic flows over a one of the pair of channels, wherein a distance between the target adjustment vector and the traffic load vector of the one channel is within a minimum distance range, wherein assignment of the traffic flows to the one channel is based at least in part on the determined matching point.

2. A method comprising:
determining a traffic load for data traffic of each of one or more traffic flows of a communications system, wherein the traffic load is determined as a load vector in a multidimensional space reflecting a traffic load for each of a plurality of priority levels of the data traffic of the respective traffic flow;

determining a channel load for each of a plurality of channels of the communications system as a channel load vector in the multidimensional space reflecting data traffic loads to be carried by the channel for each of the priority levels;

determining a load balancing target, based at least in part on the channel load vectors, to load balance the traffic flows over the channels of the communications system, wherein the load balancing target comprises a centroid point for the channel load vectors; and assigning one or more of the traffic flows to each channel, based at least in part on the respective traffic loads of the one or more traffic flows, in a manner to converge the respective channel load to the load balancing target by iteratively determining a parallel convergence for the channel load vectors for the respective channel in relation to the centroid point; and wherein the iterative determination of the parallel convergence for the channel load vectors for the respective channel in relation to the centroid point comprises determining a target vector as a difference between the channel load vector for the channel and the centroid point, and determining a matching point for a traffic load vector for at least one of the traffic flows, wherein a distance between the target vector for the channel and the traffic load vector is within a predetermined minimum distance tolerance range, wherein assignment of the traffic flows to the channel is based at least in part on the determined matching point.

3. A method comprising:

determining a traffic load for data traffic of each of one or more traffic flows of a communications system, wherein the traffic load is determined as a load vector in a multidimensional space reflecting a traffic load for each of a plurality of priority levels of the data traffic of the respective traffic flow;

determining a channel load for each of a plurality of channels of the communications system as a channel load vector in the multidimensional space reflecting data traffic loads to be carried by the channel for each of the priority levels;

determining a load balancing target, based at least in part on the channel load vectors, to load balance the traffic flows over the channels of the communications system, wherein the load balancing target comprises a centroid point for the channel load vectors;

assigning one or more of the traffic flows to each channel, based at least in part on the respective traffic loads of the one or more traffic flows, in a manner to converge the respective channel load to the load balancing target;

generating a channel load vector set, comprising the channel load vectors for the channels;

generating a difference vector set, comprising a plurality of difference vectors, wherein each difference vector reflects a difference between a respective channel load vector and the centroid point;

determining one or more match pairs for the difference vectors of the difference vector set by iteratively comparing the difference vectors in relation to the centroid point, wherein each match pair comprises a pair of difference vectors that converges on the centroid point at a distance within a predetermined range so as to cancel their respective differences to the centroid point; and generating a match pair set comprising each match pair of difference vectors; and wherein assignment of the one or more traffic flows to each channel is further based on a load balancing of load vectors for the traffic flows over the channels based on the determined match pairs.

4. A method according to claim 3, further comprising:

Iteratively performing a traffic load vector swap for the load vectors of the traffic flows, comprising generating a target adjustment vector for channels corresponding to a one match pair of difference vectors, determining a load vector adjustment distance for a traffic flow load vector of the pair of channels corresponding to the one match pair of difference vectors, and determining the traffic flow load vector based at least in part on the determined load vector adjustment distance in relation to a predetermined target vector adjustment distance for the target adjustment vector; and wherein assignment of the traffic flows to the channels corresponding to the determined match pairs of difference vectors is based at least in part on the vector swaps.

5. An apparatus comprising at least one processor, and at least one memory including computer program code, the at least one memory and the computer program code configured to, with the at least one processor, cause the apparatus to perform at least the following:

determine a traffic load for data traffic of each of one or more traffic flows of a communications system, wherein the traffic load is determined as a load vector in a multidimensional space reflecting a traffic load for each of a plurality of priority levels of the data traffic of the respective traffic flow;

determine a channel load for each of a plurality of channels of the communications system as a channel load vector in the multidimensional space reflecting data traffic to be carried by the channel for each of the priority levels;

determine a load balancing target, based at least in part on the channel load vectors, to load balance the traffic flows over the channels of the communications system, wherein the load balancing target comprises a centroid point for the channel load vectors;

assign one or more of the traffic flows to each channel based at least in part on the respective traffic loads of the one or more traffic flows, in a manner to converge the respective channel load to the determined load balancing target by iteratively determining cancellation pairs for the channel load vectors for the respective channel; and determine a matching point for each of a pair of channels, wherein the determination of the matching point comprises generating a target adjustment vector for each of the pair of channels, and determining a load vector for transmission of at least one of the traffic flows over a one of the pair of channels, wherein a distance between the target adjustment vector and the traffic flow load vector of the one channel is within a minimum distance range, wherein assignment of the traffic flows to the one channel is based at least in part on the determined matching point; and wherein the iterative determination of the cancellation pairs for the channel load vectors for the respective channel comprises determining a difference vector for each of at least two channel load vectors for the respective inroute channel as a difference between the respective channel load vector and the centroid point, and determining the cancellation pairs by comparing the difference vectors in relation to the centroid point, wherein the difference vectors converge on the centroid point at a distance within a predetermined range for a cancellation pair of channel load vectors.

6. An apparatus comprising at least one processor, and at least one memory including computer program code, the at least one memory and the computer program code configured to, with the at least one processor, cause the apparatus to perform at least the following:
- determine a traffic load for data traffic of each of one or more traffic flows of a communications system, wherein the traffic load is determined as a load vector in a multidimensional space reflecting a traffic load for each of a plurality of priority levels of the data traffic of the respective traffic flow;
- determine a channel load for each of a plurality of channels of the communications system as a channel load vector in the multidimensional space reflecting data traffic to be carried by the channel for each of the priority levels;
- determine a load balancing target, based at least in part on the channel load vectors, to load balance the traffic flows over the channels of the communications system, wherein the load balancing target comprises a centroid point for the channel load vectors; and
- assign one or more of the traffic flows to each channel based at least in part on the respective traffic loads of the one or more traffic flows, in a manner to converge the respective channel load to the determined load balancing target by iteratively determining a parallel convergence for the channel load vectors for the respective channel in relation to the centroid point; and
- wherein the iterative determination of the parallel convergence for the channel load vectors for the respective channel in relation to the centroid point comprises determining a target vector as a difference between the channel load vector for the channel and the centroid point, and determining a matching point for a traffic load vector for at least one of the traffic flows, wherein a distance between the target vector for the channel and the traffic load vector is within a predetermined minimum distance tolerance range, and wherein assignment of the traffic flows to the channel is based at least in part on the determined matching point.

7. An apparatus comprising at least one processor, and at least one memory including computer program code, the at least one memory and the computer program code configured to, with the at least one processor, cause the apparatus to perform at least the following:
- determine a traffic load for data traffic of each of one or more traffic flows of a communications system, wherein the traffic load is determined as a load vector in a multidimensional space reflecting a traffic load for each of a plurality of priority levels of the data traffic of the respective traffic flow;
- determine a channel load for each of a plurality of channels of the communications system as a channel load vector in the multidimensional space reflecting data traffic to be carried by the channel for each of the priority levels;
- determine a load balancing target, based at least in part on the channel load vectors, to load balance the traffic flows over the channels of the communications system, wherein the load balancing target comprises a centroid point for the channel load vectors;
- assign one or more of the traffic flows to each channel based at least in part on the respective traffic loads of the one or more traffic flows, in a manner to converge the respective channel load to the determined load balancing target;
- generate a channel load vector set, comprising the channel load vectors for the channels;
- generate a difference vector set, comprising a plurality of difference vectors, wherein each difference vector reflects a difference between a respective channel load vector and the centroid point;
- determine one or more match pairs for the difference vectors of the difference vector set by iteratively comparing the difference vectors in relation to the centroid point, wherein each match pair comprises a pair of difference vectors that converges on the centroid point at a distance within a predetermined range so as to cancel their respective differences to the centroid point; and
- generate a match pair set comprising each match pair of difference vectors; and
- wherein assignment of the one or more traffic flows to each channel is further based on a load balancing of load vectors for the traffic flows over the channels based on the determined match pairs.

8. An apparatus according to claim 7, wherein the apparatus is further caused to:
- iteratively perform a traffic load vector swap for the load vectors of the traffic flows, comprising generating a target adjustment vector for channels corresponding to a match pair of difference vectors, determining a load vector adjustment distance for a traffic flow load vector of the pair of channels corresponding to the one match pair of difference vectors, and determining the traffic flow load vector based at least in part on the determined load vector adjustment distance in relation to a predetermined target vector adjustment distance for the target adjustment vector; and
- wherein assignment of the traffic flows to the channels corresponding to the determined match pairs of difference vectors is based at least in part on the vector swaps.

* * * * *